United States Patent
Kim et al.

(10) Patent No.: US 12,055,378 B2
(45) Date of Patent: Aug. 6, 2024

(54) THICKNESS MEASURING DEVICE

(71) Applicant: ACTRO CO., LTD., Yongin-si (KR)

(72) Inventors: Hak Sung Kim, Seoul (KR); Gyung Hwan Oh, Seoul (KR); Dong Woon Park, Seoul (KR); Heon Su Kim, Seoul (KR)

(73) Assignee: ACTRO CO., LTD., Yongin-Si (KR)

( * ) Notice: Subject to any disclaimer, the term of this patent is extended or adjusted under 35 U.S.C. 154(b) by 390 days.

(21) Appl. No.: 17/607,952

(22) PCT Filed: Apr. 21, 2020

(86) PCT No.: PCT/KR2020/005265
§ 371 (c)(1),
(2) Date: Nov. 1, 2021

(87) PCT Pub. No.: WO2020/222454
PCT Pub. Date: Nov. 5, 2020

(65) Prior Publication Data
US 2022/0316860 A1 Oct. 6, 2022

(30) Foreign Application Priority Data

Apr. 30, 2019 (KR) .................. 10-2019-0050660

(51) Int. Cl.
*G01B 11/06* (2006.01)
(52) U.S. Cl.
CPC .................... *G01B 11/06* (2013.01)
(58) Field of Classification Search
CPC .... G01B 11/06; G01B 11/0625; G01B 15/02; G01D 1/12; G05D 27/02

(Continued)

(56) References Cited

U.S. PATENT DOCUMENTS

| 5,408,308 A | 4/1995 | Allegretto |
| 7,815,862 B2 | 10/2010 | Sopori |

(Continued)

FOREIGN PATENT DOCUMENTS

| JP | 2009-204627 A | 9/2009 |
| JP | 2013-205253 A | 10/2013 |

(Continued)

OTHER PUBLICATIONS

Korea Intellectual Property Office Notification of Reason for Refusal for KR 10-2019-0050660 dated Mar. 17, 2020.

(Continued)

*Primary Examiner* — Md M Rahman
(74) *Attorney, Agent, or Firm* — WTA Patents

(57) ABSTRACT

A thickness measuring device of the present invention includes a supporter which supports a specimen, an emission unit which emits an electromagnetic wave in a direction toward the specimen, a chamber which surrounds the specimen, a receiving unit which receives an electromagnetic wave output in a direction in which the chamber is positioned, and a control unit which receives a signal from the receiving unit and calculates a thickness of the specimen. At least a part of the chamber transmits a part of the electromagnetic wave and reflects the remaining part of the electromagnetic wave. The receiving unit receives a first electromagnetic wave having a first peak and a second electromagnetic wave having a second peak. The first peak occurs at a first time point, the second peak occurs at a second time point, and a difference between the first time point and the second time point is a first period or more.

19 Claims, 17 Drawing Sheets

(58) Field of Classification Search
USPC .......................................................... 356/630
See application file for complete search history.

(56) References Cited

U.S. PATENT DOCUMENTS

| | | |
|---|---|---|
| 2002/0097406 A1* | 7/2002 | Fielden ................. G03F 7/7065 |
| | | 356/369 |
| 2009/0100989 A1* | 4/2009 | Lazovic ............... G10H 1/0066 |
| | | 84/616 |
| 2010/0084570 A1 | 4/2010 | Katagiri |
| 2012/0170021 A1 | 7/2012 | Walsh |
| 2012/0326037 A1 | 12/2012 | Ohtake |
| 2014/0172374 A1 | 6/2014 | Brady |

FOREIGN PATENT DOCUMENTS

| | | |
|---|---|---|
| KR | 10-2017-0108281 A | 9/2017 |
| KR | 10-2018-0040636 A | 4/2018 |
| KR | 10-2018-0111424 A | 10/2018 |
| KR | 20180111424 A * | 10/2018 |
| WO | WO 2017029506 A1 * | 2/2017 |

OTHER PUBLICATIONS

International Search Report for PCT/KR2020/005265 dated Jul. 22, 2020 [PCT/ISA/210].
Written Opinion for PCT/KR2020/005265 dated Jul. 22, 2020 [PCT/ISA/237].

* cited by examiner

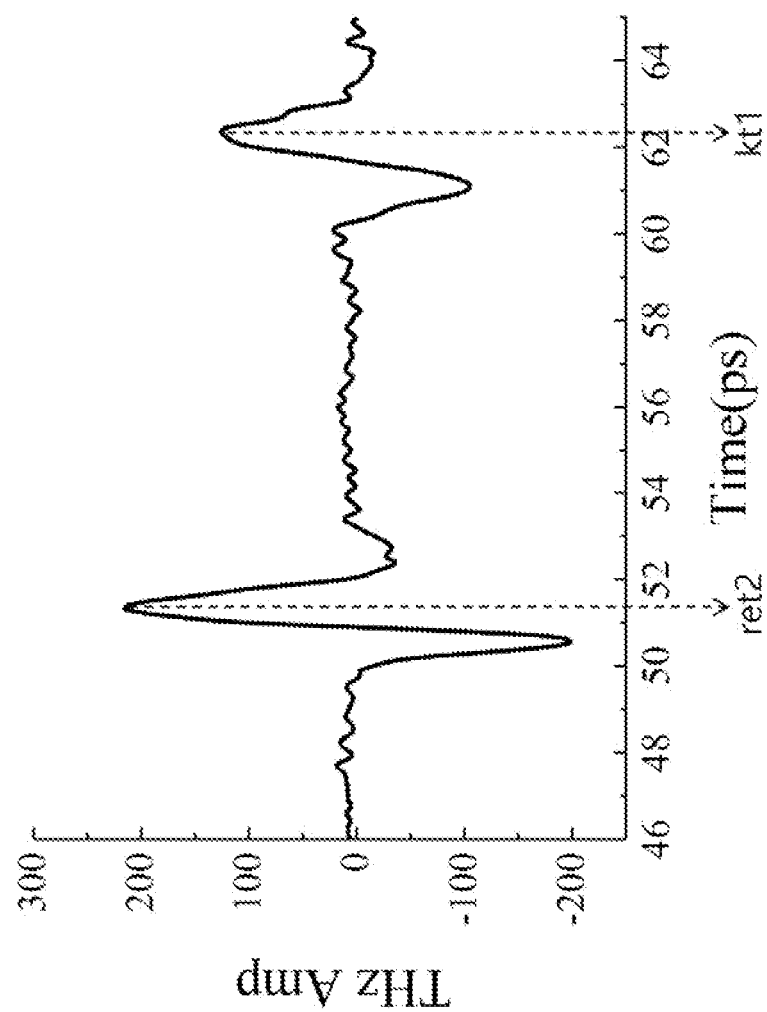

though there is reflected noise, a thickness measuring device may measure the thickness.

THICKNESS MEASURING DEVICE

CROSS REFERENCE TO RELATED APPLICATIONS

This application is a National Stage of International Application No. PCT/KR2020/005265 filed on Apr. 21, 2020, claiming priority based on Korean Patent Application No. 10-2019-0050660 filed on Apr. 30, 2019.

TECHNICAL FIELD

The present invention relates to a thickness measuring device that is a device for measuring a thickness of a specimen in a chamber using an electromagnetic wave.

BACKGROUND ART

With the development of cutting-edge industries such as semiconductor or display industries, high-density and miniaturization technologies are currently in the spotlight, and the development of non-destructive inspection technologies is also required.

Particularly, in the semiconductor or display industries, specimens, which are used for small precision components and have various thicknesses and shapes, are manufactured. The specimens may correspond to thin films. Since the specimens greatly affect the performance of products, there is a need to manufacture the specimens having uniform thicknesses. Accordingly, it is necessary to precisely measure the thickness of the specimen while the specimen is manufactured.

In addition, in a manufacturing process of the specimen, since a surface of the specimen affects precision of a circuit, the surface should not have defects or not be contaminated. In the manufacturing process of the specimen, a chamber, which is a protection apparatus, protects the specimen from external foreign matter. However, there is a problem in that the thickness of the specimen cannot be measured due to the presence of the chamber.

Technical Problem

The present invention is directed to providing a thickness measuring device which measures a thickness of a specimen using an electromagnetic wave.

The present invention is directed to providing a thickness measuring device, which measures a thickness of a specimen protected by a chamber, using an electromagnetic wave.

The present invention is directed to providing a thickness measuring device, which calculates a thickness of a specimen using peak time points of measured electromagnetic waves, using an electromagnetic wave.

The present invention is directed to providing a thickness measuring device, which calculates a thickness of a specimen using a time difference between peak time points of electromagnetic waves reflected by a surface and a rear surface of the specimen protected by a chamber using an electromagnetic wave.

The present invention is directed to providing a thickness measuring device which calculates a thickness of a specimen by minimizing a superposition effect between peaks of electromagnetic waves reflected by a surface and a rear surface of the specimen protected by a chamber and a peak of an electromagnetic wave reflected by the chamber using an electromagnetic wave.

The present invention is directed to providing a thickness measuring device which calculates a thickness of a specimen by minimizing a superposition effect between peaks of electromagnetic waves reflected by a surface and a rear surface of the specimen protected by a chamber, a peak of an electromagnetic wave reflected by the chamber, a peak of an electromagnetic wave multi-reflected in the chamber, and a peak of an electromagnetic wave multi-reflected between the chamber and the specimen using an electromagnetic wave, Objectives to be solved by the present invention are not limited to the above-described objectives, and objectives which are not described above will be clearly understood by those skilled in the art through the present specification and the accompanying drawings.

Technical Solution

One aspect of the present invention provides a thickness measuring device including a supporter which supports a specimen, an emission unit which emits an electromagnetic wave in a direction toward the specimen, a chamber which surrounds the specimen, a receiving unit which receives an electromagnetic wave output in a direction in which the chamber is positioned, and a control unit which receives a signal from the receiving unit and calculates a thickness of the specimen. At least a part of the chamber may transmit a part of the electromagnetic wave and reflect the remaining part of the electromagnetic wave. The receiving unit receives a first electromagnetic wave having a first peak and a second electromagnetic wave having a second peak. The first peak occurs at a first time point, the second peak occurs at a second time point, and a difference between the first time point and the second time point may be a first period or more.

Advantageous Effects

According to embodiments, since a thickness measuring device can measure a thickness of a specimen by emitting an electromagnetic wave to the specimen, there is an effect of performing a non-destructive inspection on the specimen. When the electromagnetic wave is a terahertz wave, since the electromagnetic wave has a higher transmittance than visible or infrared light, there are effects in that the thickness measuring device can be used in a place where there is external light, and the thickness of the specimen can be measured even without performing an additional process of blocking the light.

Since the thickness measuring device can measure a thickness of a specimen by emitting an electromagnetic wave toward the specimen protected by the chamber even without removing the chamber protecting the specimen from external foreign matter, there is an effect of conveniently measuring the thickness in a manufacturing process of the specimen.

The thickness measuring device has an effect of measuring a thickness of a specimen by emitting an electromagnetic wave to the specimen in consideration of a difference in receiving time between a first reflected wave reflected by a surface of the specimen and a second reflected wave reflected by a rear surface of the specimen.

Accordingly, the thickness measuring device may measure a thickness of a specimen in a non-contact manner and a non-destructive manner. In addition, when a refractive index of a specimen is known in advance, since a thickness can be measured using an electromagnetic wave reflection time difference of the specimen, a time for measuring the thickness of the specimen can be reduced. In addition, when a refractive index of a specimen is not known, there is a high utilization effect in that refractive indexes of layers can be measured using an electromagnetic wave transmission time difference and an electromagnetic wave reflection time difference of the specimen, and at the same time, a thickness of the specimen can also be measured using the electromagnetic wave transmission time difference or the electromagnetic wave reflection time difference of the specimen.

In addition, since the thickness measuring device can measure the thickness of the specimen using the electromagnetic wave transmission time difference or the electromagnetic wave reflection time difference of the specimen by minimizing a superposition effect between an electromagnetic wave reflected by the specimen and electromagnetic waves multi-reflected in the chamber and between the chamber and the specimen, there is an effect of accurately measuring the thickness by minimizing an influence of the chamber. The overall uniformity of the specimen can also be measured by measuring the thickness of the specimen.

Effects of the present invention are not limited to the above-described effects, and effects which are not described above will be clearly understood by those skilled in the art through the following specification and the accompanying drawings.

DESCRIPTION OF DRAWINGS

FIG. 5 is a graph showing the first electromagnetic wave and the second electromagnetic wave over time.

FIG. 6 is a graph showing the first electromagnetic wave, the second electromagnetic wave, and an overlapping wave, in which the first electromagnetic wave and the second electromagnetic wave overlap, over time.

FIG. 7 is a graph showing the overlapping wave received by the receiving unit.

FIG. 17 is a graph showing an electromagnetic wave received by a second receiving unit of the thickness measuring device according to one embodiment.

MODES OF THE INVENTION

Figure 1:
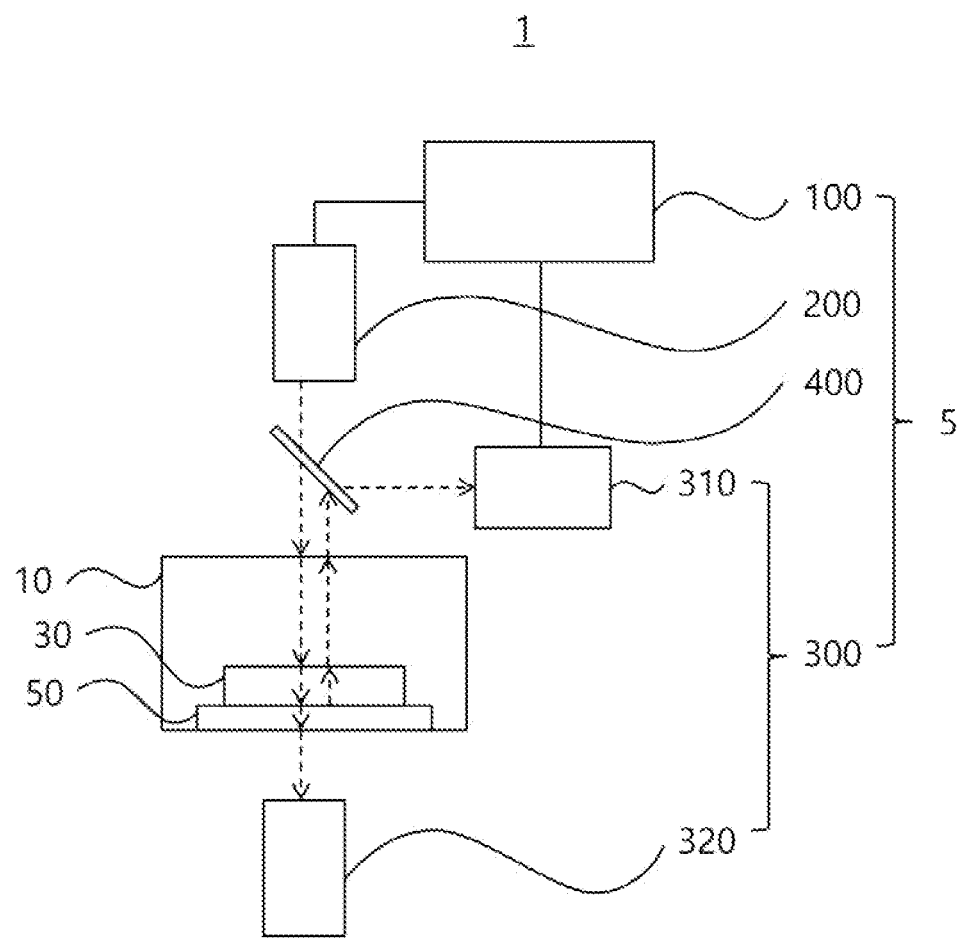
FIG. 1 is a view illustrating a thickness measuring system according to one embodiment.

Hereinafter, specific embodiments of the present invention will be described in detail with reference to the accompanying drawings. However, the scope of the present invention is not limited to the suggested embodiments, and other embodiments which are included in retrograde inventions or in the scope of the present invention may be easily suggested by those skilled in the art by adding, modifying, and deleting other components in the same scope of the present invention, and this may also be within the scope of the present invention.

In addition, components which are illustrated in drawings for embodiments and have the same function in the same scope are assigned to and described with the same reference numerals.

According to one embodiment of the present invention, a thickness measuring device may be provided, the thickness measuring device including a supporter which supports a specimen, an emission unit which emits an electromagnetic wave in a direction toward the specimen, a chamber which surrounds the specimen and of which at least a part transmits a part of the electromagnetic wave and reflects the remaining part of the electromagnetic wave, a receiving unit which receives an electromagnetic wave output in a direction in which the chamber is positioned, and a control unit which receives a signal from the receiving unit and calculates a thickness of the specimen, wherein the receiving unit receives a first electromagnetic wave having a first peak and a second electromagnetic wave having a second peak, the first peak occurs at a first time point, the second peak occurs at a second time point, and a difference between the first time point and the second time point is a first period or more.

wherein the first period is a period which satisfies that values at all time points in a range of the first time point to the second time point are smaller than a value of at least any one of the first peak and the second peak.

wherein the first period is a period corresponding to a time duration of the first electromagnetic wave, and the time duration of the first electromagnetic wave is a period between two time points which are closest to the first time point among time points at which the first electromagnetic wave has a value of zero.

wherein the first period is a period corresponding to a time duration of the first electromagnetic wave, wherein the time duration of the first electromagnetic wave is a period corresponding to a difference between a first periodic point and a second periodic point wherein a value at the first periodic point and a value at the second periodic point are zero, wherein the first periodic point is a value which is earlier than the first time point, and a time point which is closest to the first time point among the time points which gradients are positive, and wherein the second periodic point is a value which is later than the first time point, and a time point which is closest to the first time point among the time point which gradients are negative.

wherein the first period is a period corresponding to a half value of a time duration of the first electromagnetic wave, wherein the time duration of the first electromagnetic wave is a period corresponding to a difference between a first periodic point and a second periodic point, wherein the first periodic point is a value which is earlier than the first time point, and a time point which is closest to the first time point among the time points which gradients are positive, and wherein the second periodic point is a value which is later than the first time point, and a time point which is closest to the first time point among the time point which gradients are negative.

wherein the first period is a period corresponding to a time duration of the first electromagnetic wave, wherein the time duration of the first electromagnetic wave is a period corresponding to a difference between a first periodic point and a second periodic point, wherein the first periodic point is a value which is earlier than the first time point, and a time point which is closest to the first time point among the time points which second differential values thereof are zero, and wherein the second periodic point is a value which is later than the first time point, and a time point which is closest to the first time point among the time points which second differential values thereof are zero wherein the first period is a period corresponding to a time duration of the first electromagnetic wave, wherein the time duration of the first electromagnetic wave is a period corresponding to a difference between a first periodic point and a second periodic point, wherein the first periodic point is earlier than the first time point, and the second periodic point is later than the first time point, wherein the first periodic point is a time point which is closest to the first time point among time points at which a positive second differential value of the first electromagnetic wave is changed to a negative second differential value thereof, and wherein the second periodic point is a time point which is closest to the first time point among time points at which a negative second differential value of the first electromagnetic wave is changed to a positive second differential value thereof.

wherein the first electromagnetic wave has a first median, which is a half value of the first peak, at a third time point and a fourth time point, wherein the fourth time point is later than the first time point and the third time point, and wherein the first period is a period corresponding to a time difference between the third time point and the fourth time point.

wherein the first electromagnetic wave has a first median, which is a half value of the first peak, at a third time point and a fourth time point, wherein the second electromagnetic wave has a second median, which is a half value of the second peak, at a fifth time point and a sixth time point, wherein the fourth time point is a time point later than the third time point, and the sixth time point is a time point later than the fifth time point, and wherein the first period is a period which satisfies that the fifth time point is later than the fourth time point.

wherein the first electromagnetic wave has a first median, which is a half value of the first peak, at a third time point and a fourth time point, wherein the second electromagnetic wave has a second median, which is a half value of the second peak, at a fifth time point and a sixth time point, wherein a gradient at the third time point and a gradient at the fifth time point have positive values, and a gradient at the fourth time point and a gradient at the sixth time point have negative values, and wherein the first period is a period which satisfies that the fifth time point is later than the fourth time point.

wherein the control unit controls the emission unit to emit the electromagnetic wave in the direction toward the specimen, and includes a calculating unit and a storage unit, wherein the calculating unit receives a signal from the receiving unit and calculates a refractive index of the specimen and the thickness of the specimen, and wherein the storage unit stores a result value calculated by the calculating unit.

wherein the first electromagnetic wave includes a wave reflected by and output from the chamber, wherein the second electromagnetic wave includes a first reflected wave reflected by a surface of the specimen, a second reflected wave reflected by a rear surface of the specimen, and a first transmitted wave passing through and output from the specimen, wherein a peak of the first reflected wave occurs at a first reflection time point, wherein a peak of the second reflected wave occurs at a second reflection time point, and wherein a peak of the first transmitted wave occurs at a first transmission time point.

wherein the control unit prestores a first reference time point and a second reference time point, wherein the first reference time point is a time point at which a peak of a wave passing through the chamber, reflected by a supporter, and output through the chamber occurs, and the second reference time point is a time point at which a peak of a wave output by passing through one side and the other side of the chamber occurs.

wherein the control unit calculates a group refractive index of the specimen on the basis of the first reflection time point, the second reflection time point, the first transmission time point, and the second reference time point using an equation of $$n = \frac{1}{1 - 2 \cdot \frac{t_\tau - t_{t,ref}}{t_{R2} - t_{R1}}}$$

(n: group refractive index of specimen, $t_\tau$: first transmission time point, $t_{t,ref}$: second reference time point, $t_{R1}$: first reflection time point, $t_{R2}$: second reflection time point).

wherein the control unit calculates the thickness of the specimen on the basis of the first reflection time point and the first reference time point using an equation of $d_{si}=C\times$ $(t_{n,ref}-t_{R1})$ ($d_{si}$: thickness of specimen, $t_{n,ref}$ first reference time point, $t_{R1}$: first reflection time point, C: light speed).

wherein the control unit calculates the thickness of the specimen on the basis of the first reflection time point, the second reflection time point, and the group refractive index of the specimen using an equation of $$d_{si} = C \cdot \frac{t_{R2} - t_{R1}}{2 \cdot n}$$

($d_{si}$: thickness of specimen, n: group refractive index of specimen, $t_{R1}$: first reflection time point, $t_{R2}$: second reflection time point, C: light speed).

wherein the control unit calculates the thickness of the specimen on the basis of the first transmission time point, the group refractive index of specimen, and the second reference time point using an equation of $$d_{si} = \frac{C(t_\tau - t_{t,ref})}{n-1}$$

($d_{si}$: thickness of specimen, n: group refractive index of specimen, first transmittance time point, $t_{t,ref}$: second reference time point, C: light speed).

wherein the first period is 3 ps.

wherein an expression of $|d_q n_q(n-1)-d_{air}| \geq 0.45$ mm ($d_q$: thickness of chamber, $n_q$: refractive index of chamber, $d_{air}$: distance between chamber and specimen, n: number of multiple reflections in chamber) is satisfied on the basis of a thickness of the chamber, a refractive index of the chamber, a distance between the chamber and the specimen, and the number of multiple reflections in the chamber which are prestored in the control unit.

wherein an expression of $|d_q n_q \times (n-1) + d_{air} \times (m-1) - d_{si} n_{si}| \geq 0.45$ mm ($d_q$: thickness of chamber, $n_q$: refractive index of chamber, $d_{air}$: distance between chamber and specimen, n: number of multiple reflections in chamber, m: number of multiple reflections between chamber and specimen, $d_{si}$: thickness of specimen, $n_{si}$: group refractive index of specimen) is satisfied on the basis of a thickness of the chamber, a refractive index of the chamber, a distance between the chamber and the specimen, the number of multiple reflections in the chamber, and the number of multiple reflections between the chamber and the specimen which are prestored in the control unit.

wherein an expression of $|d_q n_q \times n - d_{si} n_{si}| \geq 0.45$ mm ($d_q$: thickness of chamber, $n_q$: refractive index of chamber, n: number of multiple reflections in chamber, $d_{si}$: thickness of specimen, $n_{si}$: group refractive index of specimen) is satisfied on the basis of a thickness of the chamber, a refractive index of the chamber, and the number of multiple reflections in the chamber which are stored in the control unit and the thickness of the specimen and a group refractive index of the specimen deduced by the control unit.

wherein a part of the chamber is formed of sapphire or quartz.

wherein each of the first electromagnetic wave and the second electromagnetic wave is a terahertz wave.

Hereinafter, a thickness measuring device according to one embodiment of the present invention will be described.

A thickness measuring system according to one embodiment of the present invention will be described.

FIG. 1 is a view illustrating a thickness measuring system according to one embodiment.

Referring to FIG. 1, the thickness measuring system 1 may include a thickness measuring device 5, a chamber 10, a specimen 30, and a supporter 50.

The thickness measuring system 1 is a system for measuring characteristics of the specimen 30 positioned in the chamber 10. The thickness measuring system 1 may measure a thickness of the specimen 30 disposed on the supporter 50 in the chamber 10.

The thickness measuring device 5 may include a control unit 100, an emission unit 200, a receiving unit 300, and a beam splitter 400.

In the thickness measuring device 5, the emission unit 200 may emit an electromagnetic wave to measure the thickness of the specimen 30 supported by the supporter 50 in the chamber 10 according to control of the control unit 100. In the thickness measuring device 5, the receiving unit 300 may receive an electromagnetic wave, which is reflected by or passes through the specimen 30 protected by the chamber 10 and passes through the beam splitter 400, to measure the thickness of the specimen 30.

The thickness measuring device 5 may measure the thickness of the specimen 30 in each of separated reflection and transmission modes. When the thickness measuring device 5 operates in the reflection mode, the thickness of the specimen 30 may be measured on the basis of electromagnetic waves reflected by a surface and a rear surface of the specimen 30. When the thickness measuring device 5 operates in the transmission mode, the thickness of the specimen 30 may be measured on the basis of an electromagnetic wave passing through the specimen 30.

The specimen 30 and the supporter 50 may be positioned in the chamber 10. The specimen 30 disposed on the supporter 50 may be positioned in the chamber 10.

The chamber 10 may protect the specimen 30 and the supporter 50 from external foreign matter. At least a part of a region, through which at least a part of light emitted by the emission unit 200 is reflected thereby or passes, of the chamber 10 may be a part formed of sapphire, quartz, or glass. The chamber 10 may have a predetermined thickness. An interior of the chamber 10 may be maintained in a vacuum state. A hole may be present in at least a part of a region, through which a part of light emitted by the emission unit 200 passes and which is in contact with a rear surface of the supporter 50, of the chamber 10.

The specimen 30 may be protected by the chamber 10. A gap between the surface of the specimen 30 and the chamber 10 may have a predetermined distance. At least a part of the specimen 30 may be in contact with the supporter 50.

A compound deposited on the specimen 30 may be silicon nitride or another material. The specimen 30 may be fixed to the supporter 50. When at least a part of an electromagnetic wave emitted by the emission unit 200 passes through the chamber 10 and arrives at the surface of the specimen 30, the specimen 30 may reflect the at least part of the electromagnetic wave passing through the chamber 10 or allow the at least part of the electromagnetic wave passing through the chamber 10 to pass through the specimen 30. When at least a part of an electromagnetic wave emitted by the emission unit 200 arrives at the rear surface of the specimen 30, the specimen 30 may reflect the at least part of the electromagnetic wave that has arrived at the rear surface of the specimen 30 or allow the at least part of the electromagnetic wave that has arrived at the rear surface of the specimen 30 to pass through the specimen 30. The specimen 30 may be fixed to the supporter 50 or may also be loaded without being fixed.

The specimen 30 may be positioned on the supporter 50. The supporter 50 may be disposed in the chamber 10.

The supporter 50 may serve to support the specimen 30. The supporter 50 may be formed of a material capable of reflecting an electromagnetic wave emitted by the emission unit 200 or allowing the electromagnetic wave emitted by the emission unit 200 to pass therethrough. When at least a part of an electromagnetic wave emitted by the emission unit 200 passes through the specimen 30 and arrives at the supporter 50, the supporter 50 may reflect at least a part of the electromagnetic wave emitted by the specimen 30 or allow the at least part of the electromagnetic wave emitted by the specimen 30 to pass therethrough.

The control unit 100 may allow the emission unit 200 to emit an electromagnetic wave in a direction toward the chamber 10 so as to calculate the thickness of the specimen 30 in the chamber 10. The control unit 100 may allow the receiving unit 300 to receive electromagnetic waves output from the chamber 10 and the specimen 30.

The control unit 100 may calculate the thickness of the specimen 30 on the basis of a wave received by the receiving unit 300. The control unit 100 may distinguish a wave due to the chamber 10 from a wave due to the specimen 30 among the waves received by the receiving unit 300 to calculate the thickness of the specimen 30. The control unit 100 may calculate the thickness of the specimen 30 on the basis of waves corresponding to a predetermined time region of the waves received by the receiving unit 300. The control unit 100 may calculate the thickness of the specimen 30 on the basis of peak occurrence time points of electromagnetic waves included in a predetermined time interval of the waves received by the receiving unit 300.

The control unit 100 may detect the peak occurrence time point of the electromagnetic wave received by the receiving unit 300. The control unit 100 may calculate the thickness of the specimen 30 on the basis of the peak occurrence time point of the electromagnetic wave received by the receiving unit 300. The control unit 100 may calculate the thickness of the specimen 30 on the basis of a refractive index of the specimen 30. The control unit 100 may store data about the peak occurrence time point of the electromagnetic wave received by the receiving unit 300 or the thickness of the specimen 30. The control unit 100 may calculate and output the thickness of the specimen 30.

The emission unit 200 may be positioned above the chamber 10. The emission unit 200 may be positioned to be spaced apart from the chamber 10 in a vertical direction. The emission unit 200 may be directed toward the chamber 10.

The emission unit 200 may emit an electromagnetic wave. The emission unit 200 may emit a terahertz wave. A wavelength of the electromagnetic wave emitted by the emission unit 200 may be in the range of 30 μm to 3 mm. The electromagnetic wave may be a continuous or pulse wave. A light source of the electromagnetic wave may be provided as one or more light sources. A frequency of the electromagnetic wave may be in the range of 0.1 THz to 10 THz. Since the emission unit 200 may emit the electromagnetic wave in the frequency range, the electromagnetic wave may have a higher transmittance than visible light or infrared light.

In addition, since the electromagnetic wave emitted by the emission unit 200 may be used in a place where external light is present, the thickness of the specimen 30 may be measured even without performing an additional process of blocking the external light. Since the electromagnetic wave emitted by the emission unit 200 has the higher transmittance, the electromagnetic wave may be reflected by or pass through at least a part of the chamber 10 and may arrive at the specimen 30.

The receiving unit 300 may include a first receiving unit 310 which receives an electromagnetic wave reflected by the specimen 30 and a second receiving unit 320 which receives an electromagnetic wave passing through the specimen 30. The first receiving unit 310 and the second receiving unit 320 may be positioned to be spaced apart from the beam splitter 400.

When the thickness measuring device 5 operates in the reflection mode, the first receiving unit 310 of the receiving unit 300 may receive an electromagnetic wave. When the thickness measuring device 5 operates in the transmission mode, the second receiving unit 320 of the receiving unit 300 may receive an electromagnetic wave. The receiving unit 300 of the thickness measuring device 5 may include both of the first receiving unit 310 and the second receiving unit 320 or may also selectively include any one of the first receiving unit 310 and the second receiving unit 320.

The first receiving unit 310 may be positioned on a path along which an electromagnetic wave reflected by the specimen 30 is reflected through the beam splitter 400. The first receiving unit 310 may be positioned on a path along which an electromagnetic wave reflected by the chamber 10 is reflected through the beam splitter 400. The first receiving unit 310 may be positioned on a path along which an electromagnetic wave reflected by the specimen 30 passes through the chamber 10.

The first receiving unit 310 may receive a first reflected wave which is an electromagnetic wave emitted by the emission unit 200, passing through the chamber 10, and reflected by the surface of the specimen 30 on the supporter 50. The first receiving unit 310 may receive a second reflected wave which is an electromagnetic wave emitted by the emission unit 200, passing through the chamber 10, and reflected by the rear surface of the specimen 30 on the supporter 50.

The second receiving unit 320 may be positioned on a path along which an electromagnetic wave passes through the specimen 30. The second receiving unit 320 may be positioned under the chamber 10.

The second receiving unit 320 may receive a first transmitted wave which is an electromagnetic wave emitted by the emission unit 200, passing through the chamber 10, and passing through and output from the specimen 30.

The beam splitter 400 may be positioned between the emission unit 200 and the chamber 10. The beam splitter 400 may be positioned on a path along which an electromagnetic wave is emitted from the emission unit 200 in a direction toward the specimen 30. The beam splitter 400 may allow the emission unit 200 and the first receiving unit 310 to be positioned above the chamber 10. The beam splitter 400 may allow the chamber 10 and the specimen 30 to be positioned between the emission unit 200 and the second receiving unit 320.

The beam splitter 400 may reflect a part of light incident thereon or transmit a part of the light incident thereon. When the thickness measuring device 5 operates in the reflection mode, the beam splitter 400 may transmit a part of light emitted by the emission unit 200, the transmitted light may pass through the chamber 10 and be reflected by the specimen 30 on the supporter 50, and a part of reflected light may be reflected by the beam splitter 400 and received by the first receiving unit 310.

When the thickness measuring device 5 operates in the reflection mode, light emitted by the emission unit 200 may be emitted to the beam splitter 400. At least a part of the light emitted by the emission unit 200 may pass through the beam splitter 400. The light passing through the beam splitter 400 from the emission unit 200 may be emitted to the chamber 10. At least a part of the light emitted to the chamber 10 may be reflected by the chamber 10.

At least a part of the light emitted to the chamber 10 may pass through the chamber 10 and may be reflected by the surface of the specimen 30 disposed on the supporter 50. At least a part of the light passing through the chamber 10 may be reflected by the rear surface of the specimen 30 disposed on the supporter 50. At least a part of the light reflected by the rear surface of the specimen 30 may pass through the specimen 30. The light passing through the specimen 30 may be emitted to the beam splitter 400 through the chamber 10. At least a part of the light reflected by the chamber 10 may be reflected by the beam splitter 400. The light reflected by the beam splitter 400 may be received by the first receiving unit 310.

The first receiving unit 310 may receive an electromagnetic wave reflected by the chamber 10 in the form of a first electromagnetic wave. The first receiving unit 310 may receive an electromagnetic wave reflected by the specimen 30 and passing through the chamber 10 in the form of a second electromagnetic wave.

The first receiving unit 310 may receive an electromagnetic wave, which is reflected by the surface of the specimen 30 and passes through the chamber 10, of the second electromagnetic wave in the form of the first reflected wave. The first receiving unit 310 may receive an electromagnetic wave, which is reflected by the rear surface of the specimen 30 and passes through the chamber 10, of the second electromagnetic wave in the form of the second reflected wave. The second electromagnetic wave may include the first reflected wave and the second reflected wave.

When the thickness measuring device 5 operates in the transmission mode, the beam splitter 400 may transmit a part of light emitted by the emission unit 200, and the transmitted light may pass through the chamber 10, the specimen 30, and the supporter 50 and may be received by the second receiving unit 320.

Light emitted by the emission unit 200 may be emitted to the beam splitter 400. At least a part of the light emitted by the emission unit 200 may pass through the beam splitter 400. The light passing through the beam splitter 400 from the emission unit 200 may be emitted to the chamber 10. At least a part of the light emitted to the chamber 10 may pass through the chamber 10.

At least a part of the light emitted to the chamber 10 may pass through the chamber 10 and the specimen 30 disposed on the supporter 50. At least a part of the light passing through the specimen 30 may pass through the supporter 50. At least a part of the light passing through the supporter 50 may pass through a lower end of the chamber 10. The light passing through the lower end of the chamber 10 may be received by the second receiving unit 320. The second receiving unit 320 may receive an electromagnetic wave passing through the specimen 30 in the form of the first transmitted wave. The second electromagnetic wave may include the first transmitted wave.

Figure 2:
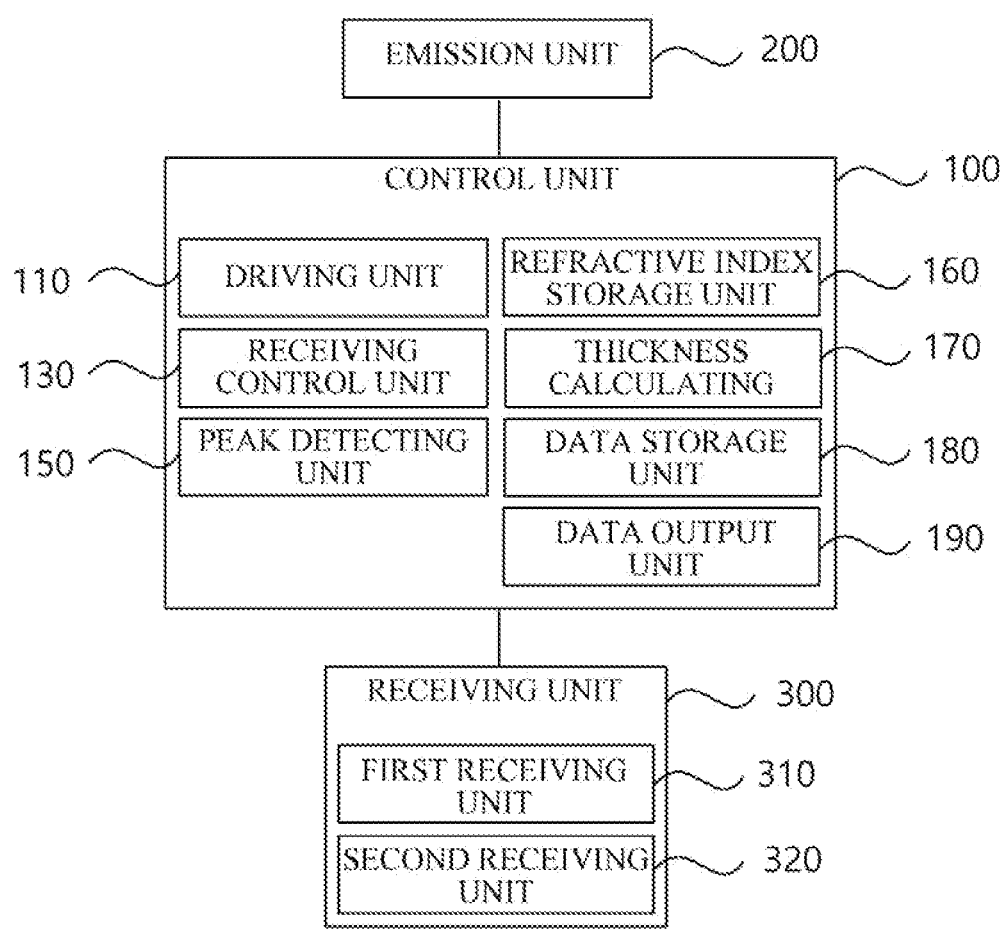
FIG. 2 is a block diagram illustrating a control unit, an emission unit, and a receiving unit of a thickness measuring device according to one embodiment.

FIG. 2 is a block diagram illustrating the control unit, the emission unit, and the receiving unit of the thickness measuring device according to one embodiment.

Referring to FIG. 2, the thickness measuring device 5 according to one embodiment includes the control unit 100, the emission unit 200, and the receiving unit 300. The control unit 100 may include a driving unit 110, a receiving control unit 130, a peak detecting unit 150, a refractive index storage unit 160, a thickness calculating unit 170, a data storage unit 180, and a data output unit 190. The receiving unit 300 may include the first receiving unit 310 and the second receiving unit 320.

The driving unit 110 may control the emission unit 200 to emit an electromagnetic wave. When the specimen 30 is positioned at a position corresponding to the emission unit 200, the driving unit 110 may control the electromagnetic wave to be emitted. When a region, in which the thickness of the specimen 30 is measured, is positioned at a position corresponding to the emission unit 200, the driving unit 110 may control an electromagnetic wave to be emitted.

The receiving control unit 130 may control the receiving unit 300 to receive an electromagnetic wave. The receiving unit 300 may receive the electromagnetic wave according to control of the receiving control unit 130. The receiving unit 300 may transfer a result of a received wave to the receiving control unit 130. The receiving control unit 130 may control the result of the wave received by the receiving unit 300 to be transferred.

When the thickness measuring device 5 operates in the reflection mode, the receiving control unit 130 may control the first receiving unit 310 to receive an electromagnetic wave emitted by the emission unit 200. The receiving control unit 130 may control the first receiving unit 310 to receive an electromagnetic wave which is an electromagnetic wave emitted by the emission unit 200 and reflected by the chamber 10. The receiving control unit 130 may control the first receiving unit 310 to receive the first reflected wave reflected by the surface of the specimen 30. The receiving control unit 130 may control the first receiving unit 310 to receive the second reflected wave reflected by the rear surface of the specimen 30.

When the thickness measuring device 5 is operated in the transmission mode, the receiving control unit 130 may control the second receiving unit 320 to receive an electromagnetic wave emitted by the emission unit 200. The receiving control unit 130 may control the second receiving unit 320 to receive the first transmitted wave which is an electromagnetic wave emitted by the emission unit 200, passing through the chamber 10, the specimen 30, and the supporter 50, and output therefrom.

The peak detecting unit 150 may detect a peak occurrence time point of an electromagnetic wave received by the receiving unit 300. The peak detecting unit 150 may detect peak occurrence time points of a plurality of electromagnetic waves received by the receiving unit 300. The peak detecting unit 150 may detect the peak occurrence time points of the electromagnetic waves and transmit results thereof to the thickness calculating unit 170 and the data storage unit 180.

When the thickness measuring device 5 operates in the reflection mode, the peak detecting unit 150 may detect a peak occurrence time point of the first reflected wave and a peak occurrence time point of the second reflected wave on the basis of electromagnetic waves received by the first receiving unit 310. The peak detecting unit 150 may detect a first reflection time point which is the peak occurrence time point of the first reflected wave. The peak detecting unit 150 may detect a second reflection time point which is the peak occurrence time point of the second reflected wave.

When the thickness measuring device 5 operates in the transmission mode, the peak detecting unit 150 may detect a peak occurrence time point of the first transmitted wave on the basis of an electromagnetic wave received by the second receiving unit 320. The peak detecting unit 150 may detect a first transmission time point which is the peak occurrence time point of the first transmitted wave.

The refractive index storage unit 160 may store a refractive index of the chamber 10. The refractive index storage unit 160 may store a predetermined refractive index of the chamber 10. The refractive index storage unit 160 may store a refractive index of the specimen 30. The refractive index storage unit 160 may store a predetermined refractive index of the specimen 30. The refractive index storage unit 160 may store an obtained refractive index of the specimen 30.

The thickness calculating unit 170 may calculate the thickness of the specimen 30. The thickness calculating unit 170 may calculate the thickness of the specimen 30 using the results transmitted from the peak detecting unit 150. The thickness calculating unit 170 may calculate the thickness of the specimen 30 on the basis of a peak occurrence time point of an electromagnetic wave detected by the peak detecting unit 150.

The thickness calculating unit 170 may calculate the thickness of the specimen 30 on the basis of a predetermined equation. The thickness calculating unit 170 may calculate the thickness of the specimen 30 on the basis of the peak occurrence time point of the electromagnetic wave obtained by the peak detecting unit 150 and at least any one of the refractive indexes stored in the refractive index storage unit 160.

The data storage unit 180 may store data about the peak occurrence time point of the electromagnetic wave detected by the peak detecting unit 150. The data storage unit 180 may store data about the thickness of the specimen 30 calculated by the thickness calculating unit 170.

When the thickness measuring device 5 operates in the reflection mode, the data storage unit 180 may store data about the first reflection time point which is a time point at which a peak of the first reflected wave is generated and the second reflection time point which is a time point at which a peak of the second reflected wave is generated. The data storage unit 180 may store data about the thickness of the specimen 30 calculated on the basis of at least any one of the first reflection time point, the second reflection time point, and the refractive index of the specimen 30. The data storage unit 180 may store the data about the thickness of the specimen 30 calculated by the thickness calculating unit 170.

When the thickness measuring device 5 operates in the transmission mode, the data storage unit 180 may store data about the first transmission time point which is a time point at which a peak of the first transmitted wave is generated. The data storage unit 180 may store data about the thickness of the specimen 30 calculated on the basis of at least any one of the first transmission time point and the refractive index of the specimen 30. The data storage unit 180 may store the data about the thickness of the specimen 30 calculated by the thickness calculating unit 170.

The data output unit 190 may output the date about the thickness of the specimen 30 calculated by the thickness calculating unit 170.

Figure 3:
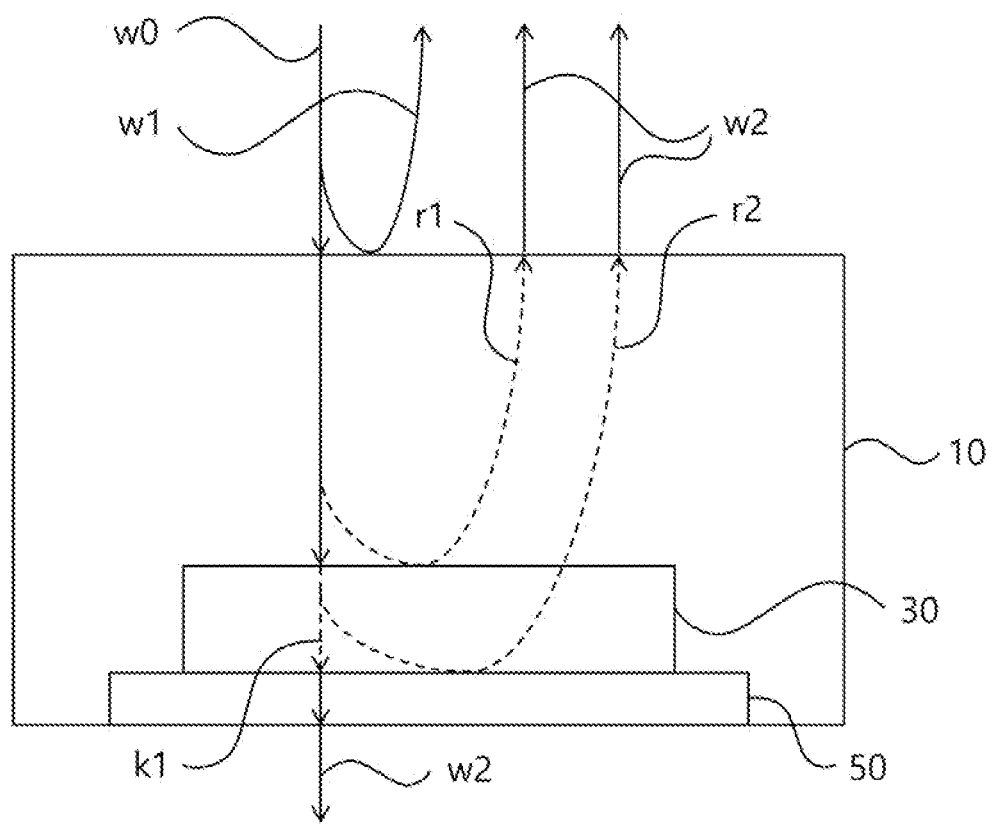
FIG. 3 is a view illustrating a single-layer specimen, an electromagnetic wave which is output by being reflected from the single-layer specimen, and an electromagnetic wave which is output by passing through the single-layer specimen in the thickness measuring device according to one embodiment.

FIG. 3 is a view illustrating a single-layer specimen, an electromagnetic wave which is output by being reflected from the single-layer specimen, and an electromagnetic wave which is output by passing through the single-layer specimen in the thickness measuring device according to one embodiment.

Referring to FIG. 3, the chamber 10 receives an emitted wave w0 from the emission unit 200. The emitted wave w0 may be reflected by or may pass through the chamber 10. A part of the emitted wave w0 may be reflected by the chamber 10 and output in the form of a first electromagnetic wave w1. A part of the emitted wave w0 may pass through the chamber 10 and may be output into the chamber 10.

When the part of the emitted wave w0 passes through the chamber 10 and is output into the chamber 10, the part of the emitted wave w0 passing through the chamber 10 may arrive at the surface of the specimen 30. A part of the emitted wave w0 passing through the chamber 10 may be reflected by the surface of the specimen 30 and output in the form of the first reflected wave r1, a part of the emitted wave w0 may pass through the surface of the specimen 30 and arrive at the rear surface of the specimen 30 in the form of the first transmitted wave k1. The first reflected wave r1 passes through the chamber 10 and is received by the receiving unit 300 in the form of the second electromagnetic wave w2.

A part of the first transmitted wave k1 may be reflected by the rear surface of the specimen 30 and output in the form of the second reflected wave r2, and a part of the first transmitted wave k1 may pass through and be output from the supporter 50. The second reflected wave r2 passes through the chamber 10 and is received by the receiving unit 300 in the form of the second electromagnetic wave w2. The first transmitted wave k1 passes through the supporter 50 and is received by the receiving unit 300 in the form of the second electromagnetic wave w2.

When the thickness measuring device 5 operates in the reflection mode, the first receiving unit 310 may receive the first electromagnetic wave w1. The first receiving unit 310 may receive the first reflected wave r1 and the second reflected wave r2. The second electromagnetic wave w2 may include the first reflected wave r1 and the second reflected wave r2. The first receiving unit 310 may receive the second electromagnetic wave w2.

When the thickness measuring device 5 operates in the transmission mode, the second receiving unit 320 may receive the first transmitted wave k1. The second electromagnetic wave w2 may include the first transmitted wave k1. The second receiving unit 320 may receive the second electromagnetic wave w2.

A part of the emitted wave w0 output from the chamber 10, the first electromagnetic wave w1, and the second electromagnetic wave w2 may be output after multiple reflections occur in the chamber 10. The multiple reflections in the chamber 10 will be described below.

Figure 4:
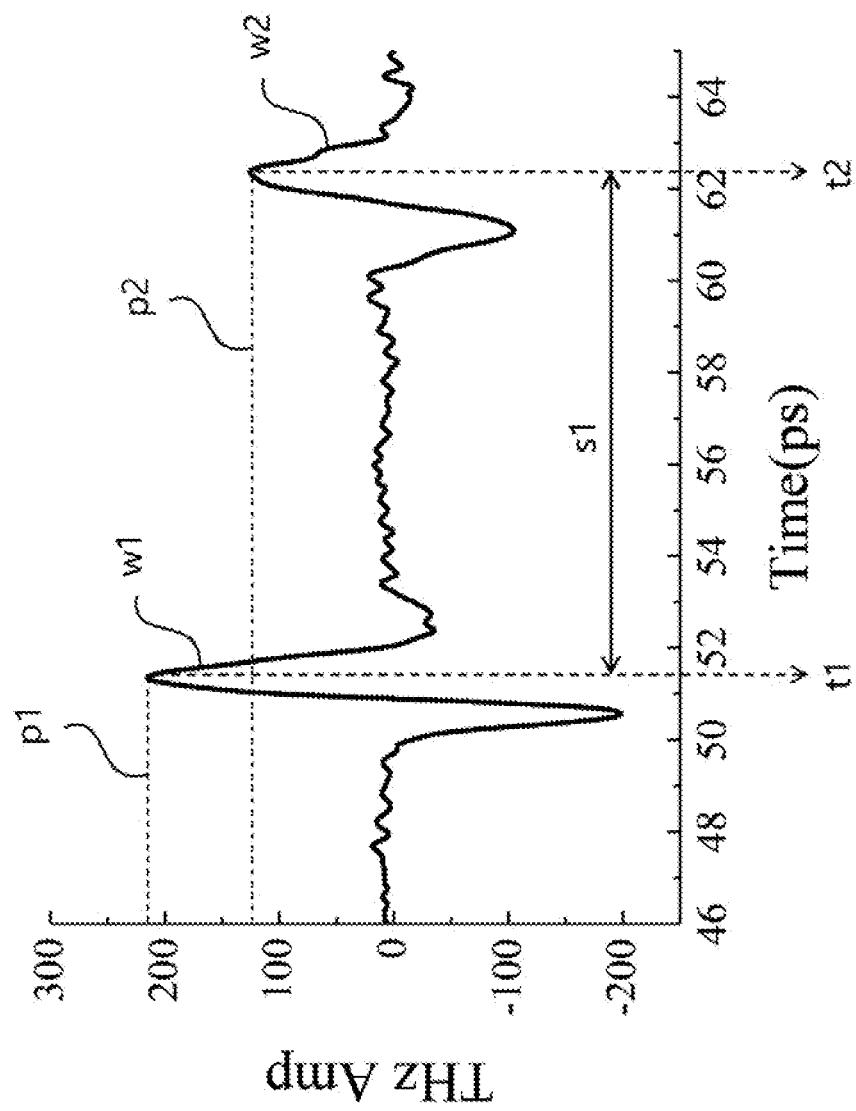
FIG. 4 is a graph showing an electromagnetic wave received by the receiving unit of the thickness measuring device according to one embodiment over time.

FIG. 4 is a graph showing an electromagnetic wave received by the receiving unit of the thickness measuring device according to one embodiment over time.

Referring to FIG. 4, when the thickness measuring device 5 operates in the reflection mode, the emission unit 200 emits the electromagnetic wave in a direction toward the chamber 10, and the first electromagnetic wave w1 reflected by the chamber 10 is received by the first receiving unit 310 according to control of the receiving control unit 130 of the control unit 100. The first electromagnetic wave w1 has a first peak p1, and a time point, at which the first peak p1 occurs, is a first time point t1. The first electromagnetic wave w1 may be received by the first receiving unit 310.

The emission unit 200 emits the electromagnetic wave to the chamber 10 according to control of the driving unit 110 of the control unit 100, and the second electromagnetic wave w2 passing through the chamber 10 and reflected by the specimen 30 may be received by the first receiving unit 310 according to control of the receiving control unit 130 of the control unit 100. The second electromagnetic wave w2 has a second peak p2, and a time point, at which the second peak p2 occurs, is a second time point t2.

When the thickness measuring device 5 operates in the transmission mode, the first electromagnetic wave w1 may be a wave emitted by the emission unit 200 that sequentially passes through the chamber 10 and the supporter 50. The first electromagnetic wave w1 may be a second reference wave. The first electromagnetic wave w1 has a first peak p1, and a time point, at which the first peak p1 occurs, is a first time point t1. The first electromagnetic wave w1 may be received by the second receiving unit 320.

The emission unit 200 emits an electromagnetic wave in the direction toward the chamber 10. The electromagnetic wave emitted by the emission unit 200 may sequentially pass through the chamber 10 and the specimen 30 and may be received by the second receiving unit 320 in the form of the second electromagnetic wave w2. The second electromagnetic wave w2 has a second peak p2, and a time point, at which the second peak p2 occurs, is a second time point t2.

An interval between the first time point t1 and the second time point t2 is greater than or equal to a first period s1. The first period s1 may be a predefined period. Since the interval between the first time point t1 and the second time point t2 is greater than or equal to the first period s1, the first time point t1 and the second time point t2 may be distinguished from each other. The peak detecting unit 150 of the control unit 100 may detect the first time point t1 and the second time point t2 which are separated by the first period s1.

Since the interval between the first time point t1 and the second time point t2 is greater than or equal to the first period s1, the thickness measuring device 5 may minimize a superposition effect due to electromagnetic waves which are reflected by or pass through the chamber 10 and are output in a process in which the thickness of the specimen 30 is measured. The superposition effect due to the chamber 10 will be described below.

Figure 5:
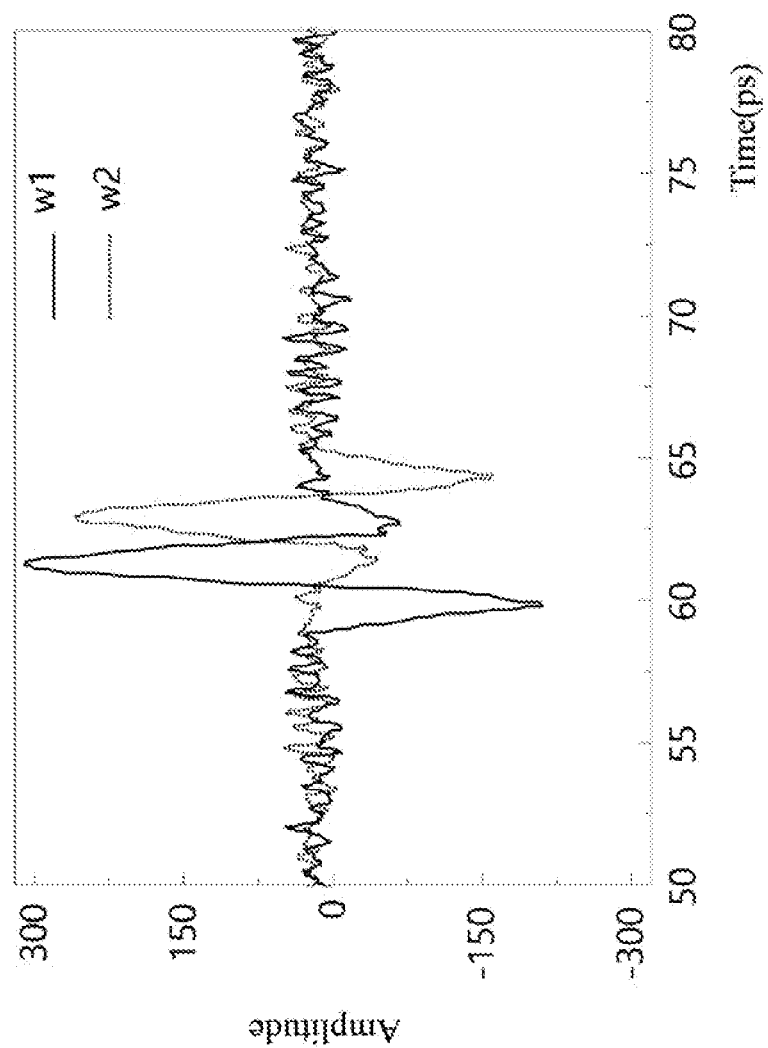
FIGS. 5 to 7 are views for describing superposition of a first electromagnetic wave and a second electromagnetic wave according to one embodiment.
Figure 6:
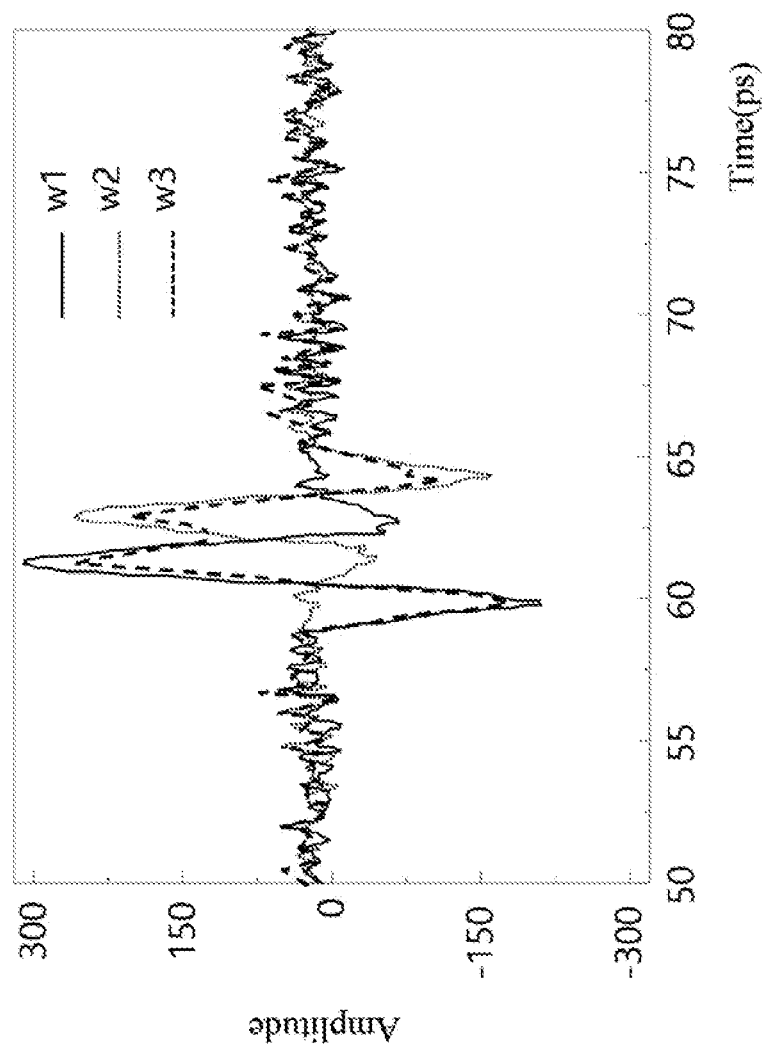
Figure 7:
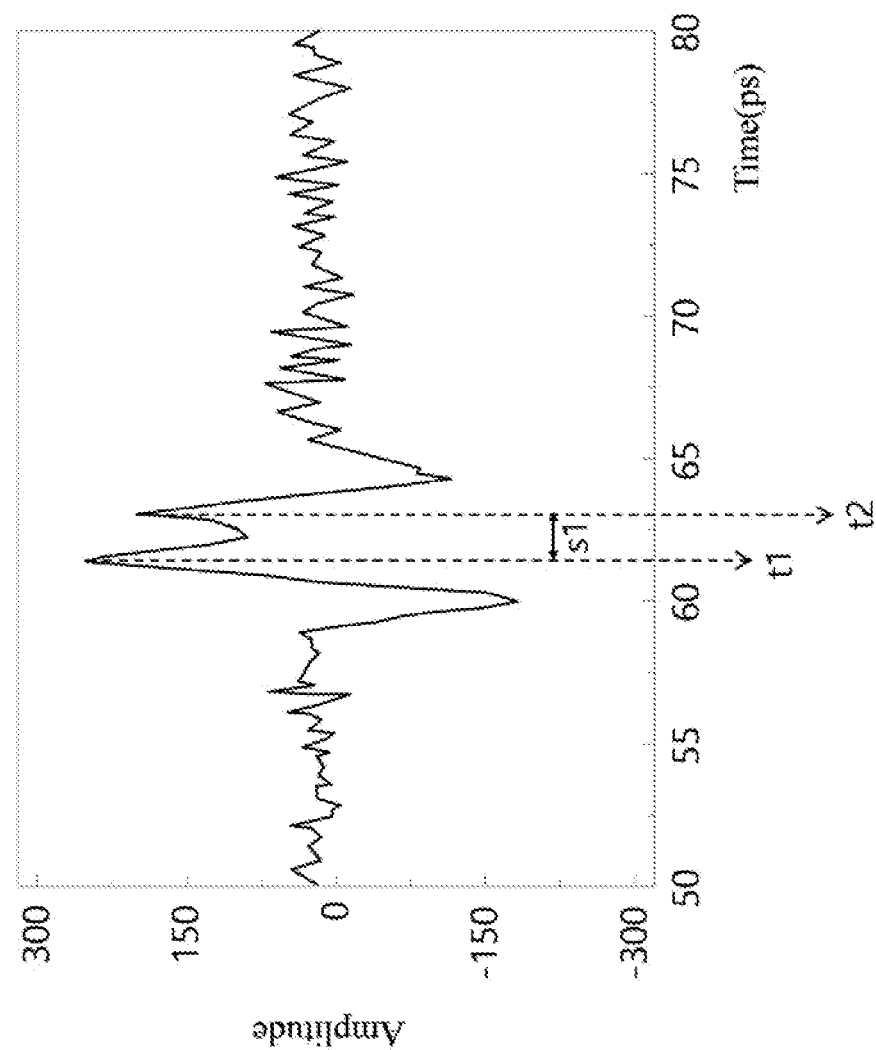

FIGS. 5 to 7 are views for describing superposition of the first electromagnetic wave and the second electromagnetic wave according to one embodiment.

FIG. 5 is a graph showing the first electromagnetic wave and the second electromagnetic wave over time. FIG. 6 is a graph showing the first electromagnetic wave, the second electromagnetic wave, and an overlapping wave, in which the first electromagnetic wave and the second electromagnetic wave overlap, over time. FIG. 7 is a graph showing the overlapping wave received by the receiving unit.

Referring to FIGS. 5 to 7, at least a part of the first electromagnetic wave w1 which is the electromagnetic wave emitted by the emission unit 200 and reflected by and output from the chamber 10 and at least a part of the second electromagnetic wave w2 which is the electromagnetic wave emitted by the emission unit 200, passing through the chamber 10, and reflected by and output from the specimen 30 may overlap and may be formed in the form of an overlapping wave w3. The receiving unit 300 may receive the overlapping wave w3 according to control of the receiving control unit 130 of the control unit 100.

In the thickness measuring system 1, before the second electromagnetic wave w2, which is reflected by or passes through and is output from the specimen 30, is received by the receiving unit 300, the first electromagnetic wave w1, which is reflected by or passes through and is output from the chamber 10, may be received by the receiving unit 300 first.

The receiving unit 300 may receive the first electromagnetic wave w1 and the second electromagnetic wave w2. The receiving unit 300 may receive the first electromagnetic wave w1 earlier than the second electromagnetic wave w2.

Since a distance, in which the second electromagnetic wave w2 arrives at the receiving unit 300, is longer than a distance, in which the first electromagnetic wave w1 arrives at the receiving unit 300, the receiving unit 300 may receive the first electromagnetic wave w1 earlier than the second electromagnetic wave w2.

Since the second electromagnetic wave w2 arrives at the receiving unit 300 by passing through a plurality of media when compared to the first electromagnetic wave w1, the receiving unit 300 may receive the first electromagnetic wave w1 earlier than the second electromagnetic wave w2.

The first electromagnetic wave w1 and the second electromagnetic wave w2 may overlap. The first electromagnetic wave w1 and the second electromagnetic wave w2 may overlap to form the overlapping wave w3. The receiving unit 300 may receive the overlapping wave w3.

The thickness measuring device 5 may be formed so that the interval between the first time point t1 and the second time point t2 is at least the first period s1. The peak detecting unit 150 of the control unit 100 may detect the first time point t1 and the second time point t2 which are separated by the first period s1. The thickness calculating unit 170 of the control unit 100 may calculate the thickness of the specimen 30 on the basis of the detected first time point t1 and the detected second time point t2.

In order for the peak detecting unit 150 to distinguish the first time point t1 and the second time point t2 from each other, the first time point t1 and the second time point t2 should be separated by the first period s1. The first period s1 may be caused by the distance between the chamber 10 and the specimen 30.

The distance between the chamber 10 and the specimen 30 may be preset. As the distance between the chamber 10 and the specimen 30 becomes longer, the first time point t1 and the second time point t2 may be clearly distinguished. In order to increase the distance between the chamber 10 and the specimen 30, a height of the chamber 10 should increase.

However, since the increasing of the height of the chamber 10 may increase a manufacturing cost, there may be a limit in terms of the cost. Accordingly, in the present invention, even when the first electromagnetic wave w1 and the second electromagnetic wave w2 overlap, the second time point t2 and the first time point t1, which are needed to calculate the thickness of the specimen 30, may be distinguished.

As illustrated in FIG. 7, in the overlapping wave w3 received by the receiving unit 300, the first time point t1 and the second time point t2 may be distinguished because of having as much of an interval as the first period s1. The first period s1 may be a period which satisfies that a value at any time point from the first time point t1 to the second time point t2 is less than a value of at least any one of the first peak p1 and the second peak p2.

In the overlapping wave w3 received by the receiving unit 300, a time point at which a highest peak occurs and a time point at which a next peak occurs during the first period s1 including the first time point t1 and the second time point t2 may be the first time point t1 and the second time point t2.

Figure 8:
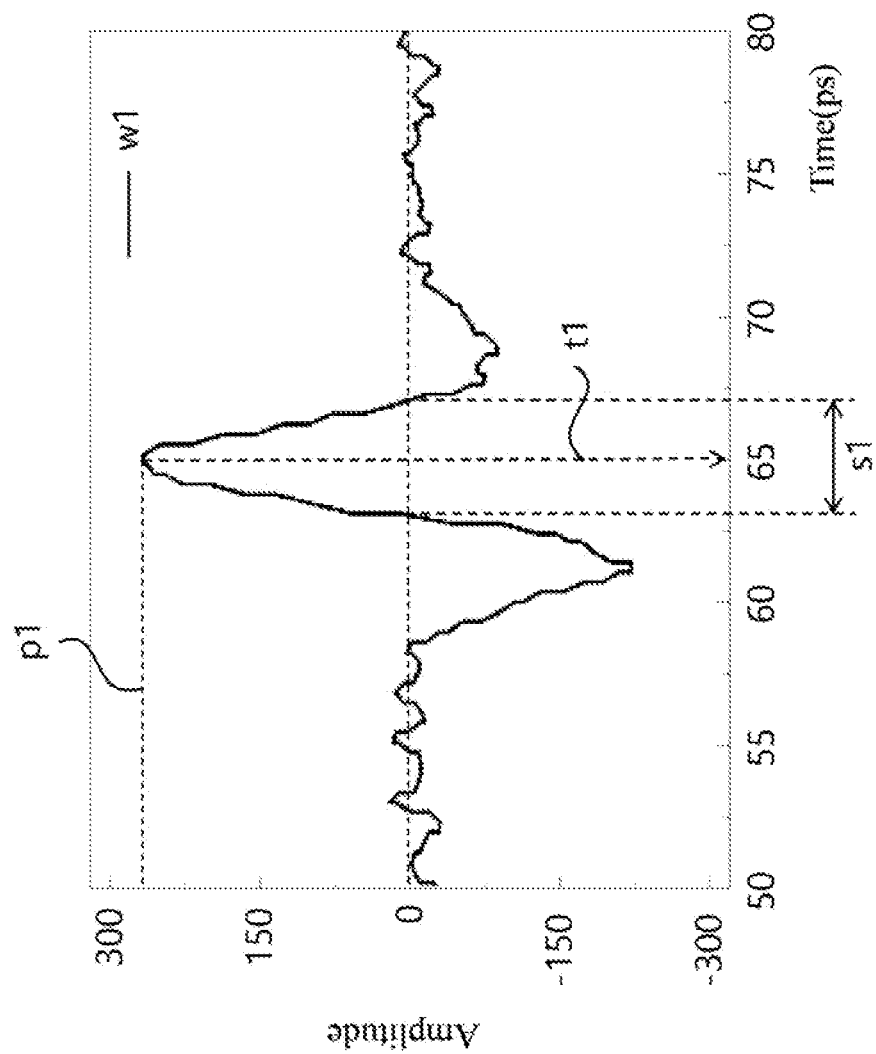
FIG. 8 is a graph showing the first electromagnetic wave received by the receiving unit according to one embodiment of the thickness measuring device.

FIG. 8 is a graph showing the first electromagnetic wave received by the receiving unit according to one embodiment of the thickness measuring device.

As illustrated in FIG. 8, according to control of the driving unit 110 of the control unit 100, the emission unit 200 may emit an electromagnetic wave toward the chamber 10, and the electromagnetic wave reflected by or passing through the chamber 10 may be received by the receiving unit 300 in the form of the first electromagnetic wave w1.

The first electromagnetic wave w1 may have the first peak p1, and the first peak p1 may occur at the first time point t1. The first time point t1 and the second time point t2 are separated by the first period s1, and the first period s1 may be a period corresponding to a time duration of the first electromagnetic wave w1. The time duration of the first electromagnetic wave w1 may be a time between two time points which are closest to the first time point t1 among time points at which the first electromagnetic wave w1 has a value of zero.

Alternatively, the time duration of the first electromagnetic wave w1 may be a time between two time points which are closest to the first time point t1 among time points at which the first electromagnetic wave w1 has a value which is a median between a positive peak value of the first peak p1 and a negative peak value.

Figure 9:
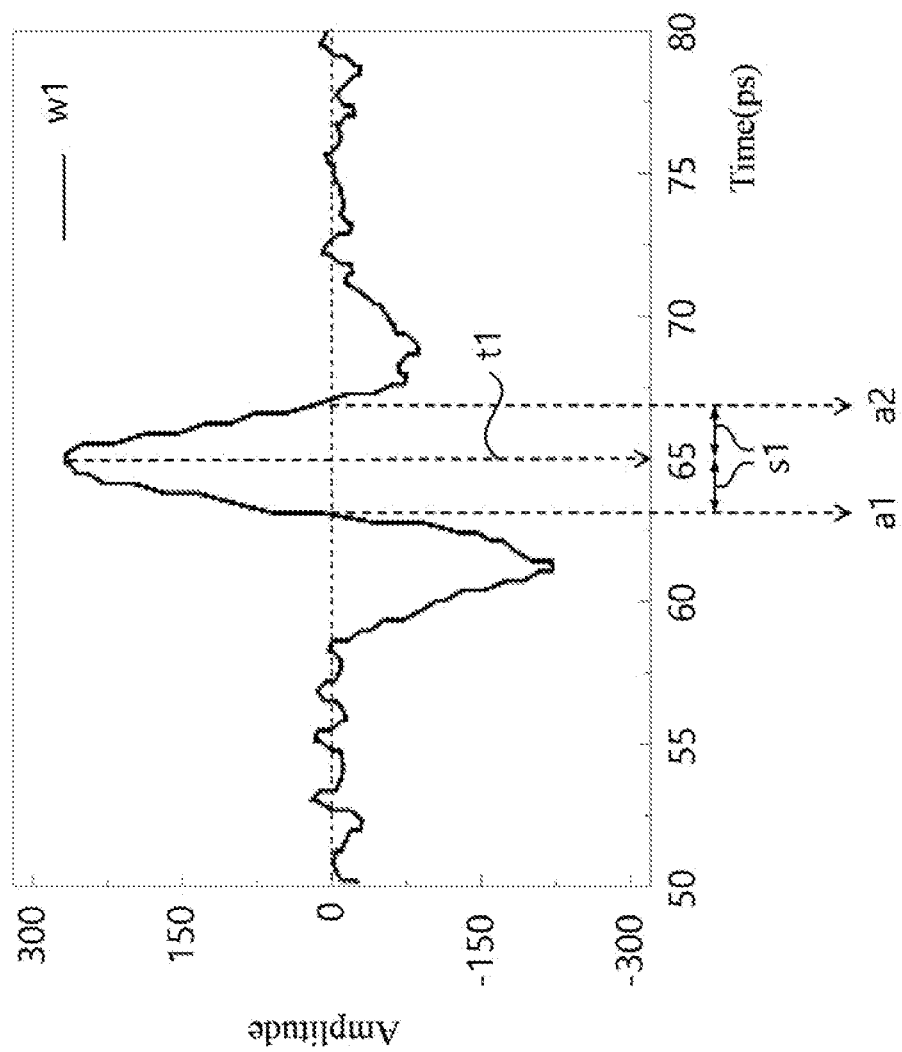
FIG. 9 is a graph showing a first electromagnetic wave received by the receiving unit according to one embodiment.

FIG. 9 is a graph showing a first electromagnetic wave received by the receiving unit according to one embodiment.

As illustrated in FIG. 9 the emission unit 200 may emit the electromagnetic wave toward the chamber 10 according to control of the driving unit 110 of the control unit 100, and the electromagnetic wave reflected by or passing through the chamber 10 may be received by the receiving unit 300 in the form of the first electromagnetic wave w1. The first electromagnetic wave w1 may have the first peak p1, and the first peak p1 may occur at the first time point t1. The first time point t1 may be separated from the second time point t2 by the first period s1, and the first period s1 may be a period corresponding to a half value of the time duration of the first electromagnetic wave w1.

The time duration of the first electromagnetic wave w1 corresponds to a time from a first periodic point a1 to a second periodic point a2. The first periodic point a1 is a time point which is earlier than and closest to the first time point t1 among time points at which the first electromagnetic wave w1 has a value of zero and a positive gradient. The second periodic point a2 is a time point which is later than and closest to the first time point t1 among time points at which the first electromagnetic wave w1 has a value of zero and a negative gradient.

Alternatively, the time duration of the first electromagnetic wave w1 may be a time between two time points which are closest to the first time point t1 among time points at which the first electromagnetic wave w1 has a value which is a median between a positive peak value of the first peak p1 and a negative peak value.

Figure 10:
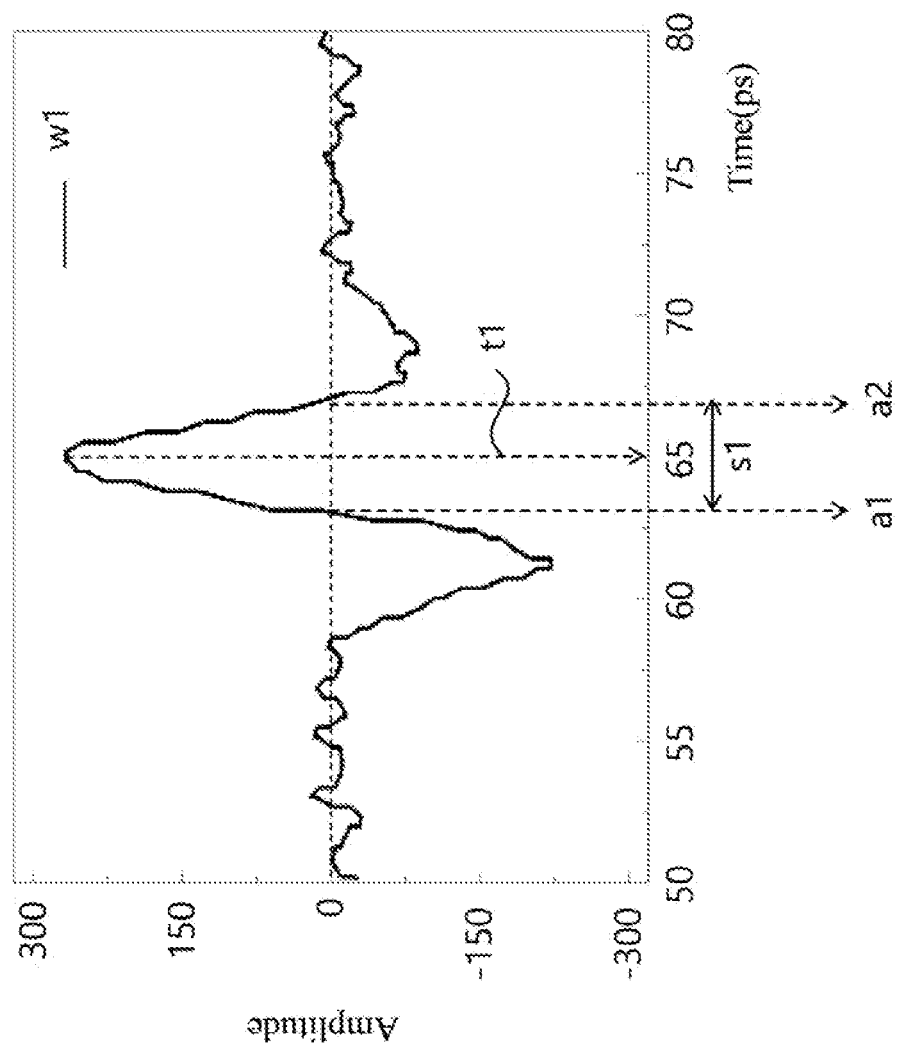
FIG. 10 is a graph showing the first electromagnetic wave received by the receiving unit according to one embodiment of the thickness measuring device.

FIG. 10 is a graph showing the first electromagnetic wave received by the receiving unit according to one embodiment of the thickness measuring device.

As illustrated in FIG. 10, according to control of the driving unit 110 of the control unit 100, the emission unit 200 may emit the electromagnetic wave toward the chamber 10, and the electromagnetic wave reflected by or passing through the chamber 10 may be received by the receiving unit 300 in the form of the first electromagnetic wave w1. The first electromagnetic wave w1 may have the first peak p1, and the first peak p1 may occur at the first time point t1. The first time point t1 may be separated from the second time point t2 by a first period s1, and the first period s1 may be a period corresponding to a time duration of the first electromagnetic wave w1.

The time duration corresponds to a time from a first periodic point a1 and a second periodic point a2 of the first electromagnetic wave w1. The first periodic point a1 is a time point which is earlier than and closest to the first time point t1 among time points at which the first electromagnetic wave w1 has a value of zero and a positive gradient. The second periodic point a2 is a time point which is later than and closest to the first time point t1 among time points at which the first electromagnetic wave w1 has a value of zero and a negative gradient.

Figure 11:
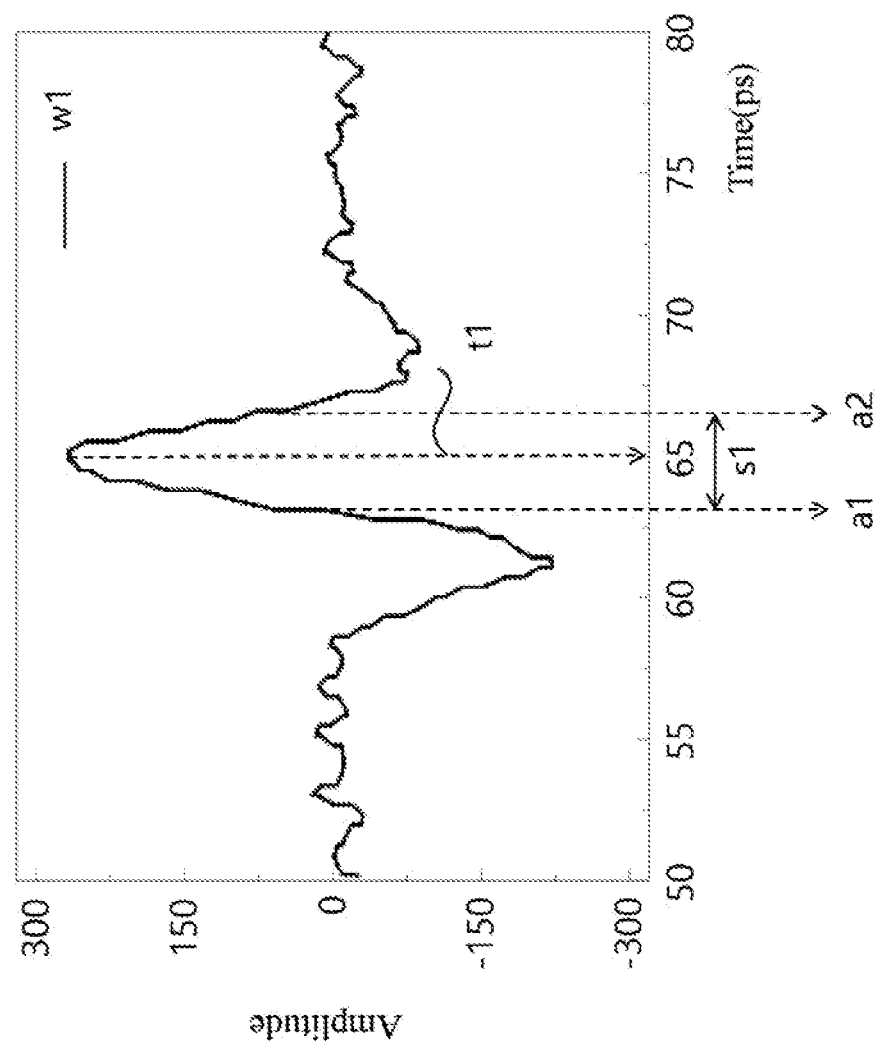
FIG. 11 is a graph showing the first electromagnetic wave received by the receiving unit according to one embodiment of the thickness measuring device.

FIG. 11 is a graph showing the first electromagnetic wave received by the receiving unit according to one embodiment of the thickness measuring device.

As illustrated in FIG. 11, according to control of the driving unit 110 of the control unit 100, the emission unit 200 may emit the electromagnetic wave toward the chamber 10, and the electromagnetic wave reflected by or passing through the chamber 10 may be received by the receiving unit 300 in the form of the first electromagnetic wave w1. The first electromagnetic wave w1 may have the first peak p1, and the first peak p1 may occur at the first time point t1. The first time point t1 may be separated from the second time point t2 by the first period s1, and the first period s1 may be a period corresponding to a time duration of the first electromagnetic wave w1

The time duration of the first electromagnetic wave w1 corresponds to a time from a first periodic point a1 to a second periodic point a2. The first periodic point a1 is a time point which is closest to the first time point t1 among time points at which the first electromagnetic wave w1 has a second differential value of zero and which are earlier than the first time point t1. The second periodic point a2 is a time point which is closest to the second time point t2 among time points at which the first electromagnetic wave w1 has a second differential value of zero and which is later than the first time point t1.

Alternatively, the first periodic point a1 is a time point which is closest to the first time point t1 among time points, which is earlier than the first time point t1 of the first electromagnetic wave w1, and at which a positive sign of a second differential value of the first electromagnetic wave w1 is changed to a negative sign thereof. The second periodic point a2 is a time point which is closest to the first time point t1 among time points, which is later than the first time point t1 of the first electromagnetic wave w1, and at which a negative sign of the second differential value of the first electromagnetic wave w1 is changed to a positive sign thereof.

Figure 12:
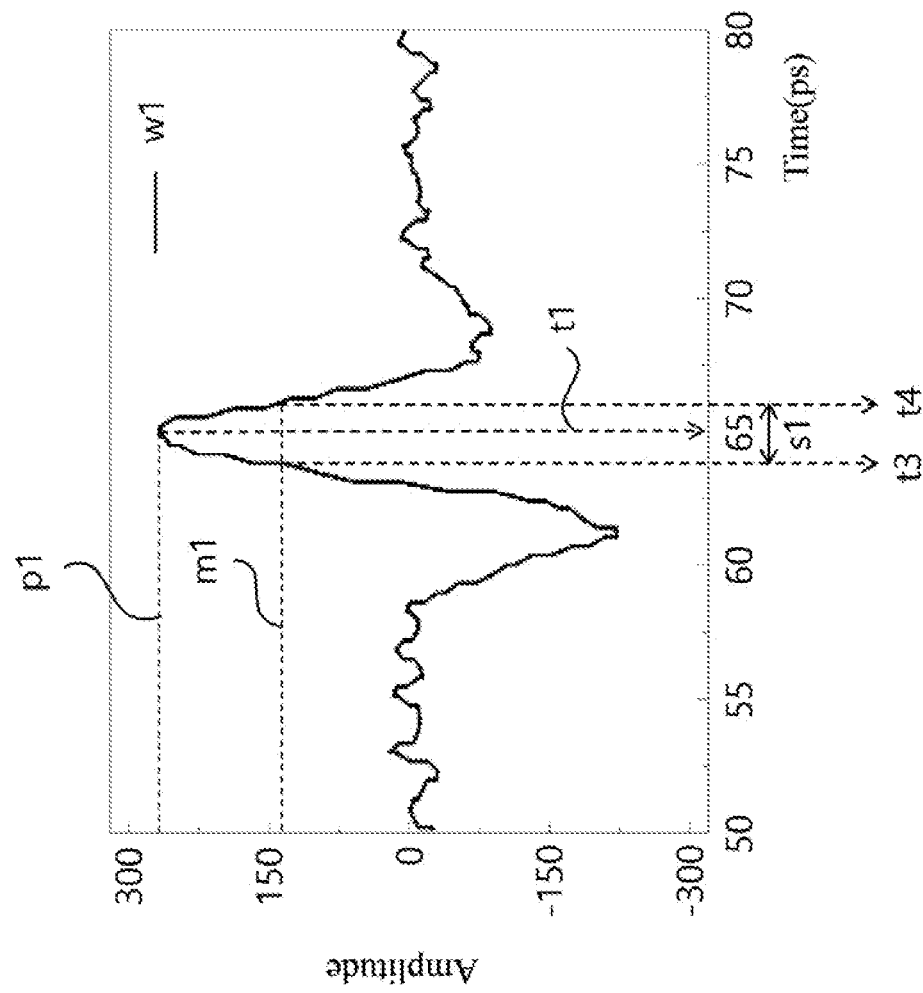
FIG. 12 is a graph showing the first electromagnetic wave received by the receiving unit according to one embodiment of the thickness measuring device.

FIG. 12 is a graph showing the first electromagnetic wave received by the receiving unit according to one embodiment of the thickness measuring device.

As illustrated in FIG. 12, according to control of the driving unit 110 of the control unit 100, the emission unit 200 may emit the electromagnetic wave toward the chamber 10, and the electromagnetic wave reflected by or passing through the chamber 10 may be received by the receiving unit 300 in the form of the first electromagnetic wave w1. The first electromagnetic wave w1 may have the first peak p1, and the first peak p1 may occur at the first time point t1. The first time point t1 may be separated from the second time point t2 by the first period s1, and the first period s1 may be a period corresponding to a full width at half maximum (FWHM) of the first electromagnetic wave w1.

The FWHM of the first electromagnetic wave w1 may be determined by a third time point t3 and a fourth time point t4. On the first electromagnetic wave w1, there may be a time point at which the first electromagnetic wave w1 has a median m1 which is a half value of a value of the first peak p1. The median m1 which is the half value of the value of the first peak p1 of the first electromagnetic wave w1 may be generated at the third time point t3 and the fourth time point t4, and the fourth time point t4 is a time point later than the third time point t3. The first period s1 is a period corresponding to a time difference between the third time point t3 and the fourth time point t4. The second time point t2, at which the second peak p2 of the second electromagnetic wave w2 occurs, is separated from the first time point t1 by the first period s1.

The FWHM of the first electromagnetic wave w1 is an interval in which the first peak p1, which has a meaningful value, may be ensured. Only when the first time point t1, at which the first peak p1 occurs, is separated from the second time point t2 by the interval of the FWHM, the first time point t1, at which the first peak p1 occurs, may be ensured even when the first electromagnetic wave w1 and the second electromagnetic wave w2 overlap.

Figure 13:
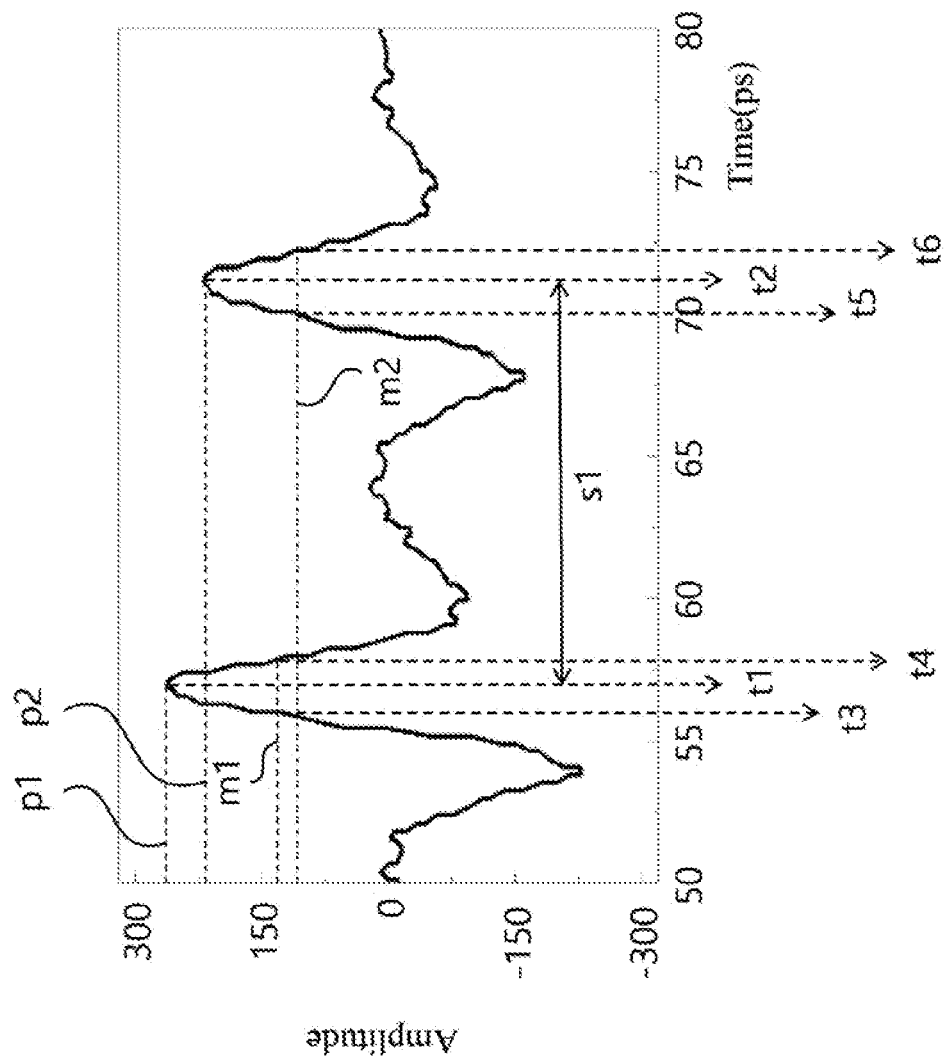
FIG. 13 is a graph showing an electromagnetic wave received by the receiving unit according to one embodiment of the thickness measuring device.

FIG. 13 is a graph showing an electromagnetic wave received by the receiving unit according to one embodiment of the thickness measuring device.

As illustrated in FIG. 13, the emission unit 200 may emit an electromagnetic wave toward the chamber 10, and the electromagnetic wave reflected by or passing through the chamber 10 may be received by the receiving unit 300 in the form of the first electromagnetic wave w1. The first electromagnetic wave w1 may have the first peak p1, and the first peak p1 may occur at the first time point t1.

The emission unit 200 may emit the electromagnetic wave toward the chamber 10, and the electromagnetic wave passing through the chamber 10 may be reflected by or passing through the specimen 30 and received by the receiving unit 300 in the form of the second electromagnetic wave w2. The second electromagnetic wave w2 may have the second peak p2, and the second peak p2 may occur at the second time point t2.

The first time point t1 may be separated from the second time point t2 by the first period s1, and the first period s1 may be an interval by which an FWHM of the first electromagnetic wave w1 and an FWHM of the second electromagnetic wave w2 do not overlap.

The FWHM of the first electromagnetic wave w1 may be defined by a third time point t3 and a fourth time point t4. On the first electromagnetic wave w1, a time point, at which the first electromagnetic wave w1 has a median m1 which is a half value of a value of the first peak p1, may be present. The median m1 which is the half value of the value of the first peak p1 of the first electromagnetic wave w1 may be generated at the third time point t3 and the fourth time point t4, and the fourth time point t4 is a time point later than the third time point t3. The FWHM of the first electromagnetic wave w2 may be defined by a fifth time point t5 and a sixth time point t6.

On the second electromagnetic wave w2, a time point, at which a median m2 which is a half value of a value of the second peak p2, may be present. The median m2 which is the half value of the value of the second peak p2 of the second electromagnetic wave w2 may be generated at the fifth time point t5 and the sixth time point t6, and the sixth time point t6 is a time point later than the fifth time point t5. The first period s1 is a period which satisfies that the fifth time point t5 is a time point later than the fourth time point t4. The second time point t2, at which the second peak p2 of the second electromagnetic wave w2 occurs, is separated from the first time point t1 by the first period s1.

Alternately, the third time point t3 and the fifth time point t5 may be time points at which gradients are positive, and the fourth time point t4 and the sixth time point t6 may be time points at which gradients are negative. The first period s1 is a period which satisfies that the fifth time point t5 is a time point later than the fourth time point t4.

The FWHM of the first electromagnetic wave w1 is an interval by which the first peak p1 having a meaningful value is ensured. The FWHM of the first electromagnetic wave w2 is an interval by which the second peak p2 having a meaningful value is ensured.

Only when the FWHM of the first electromagnetic wave w1 and the FWHM of the second electromagnetic wave w2 are separated from each other, the first time point t1, at which the first peak p1 occurs, and the second time point t2, at which the second peak p2 occurs, may be ensured even when the first electromagnetic wave w1 and the second electromagnetic wave w2 overlap.

Figure 14:
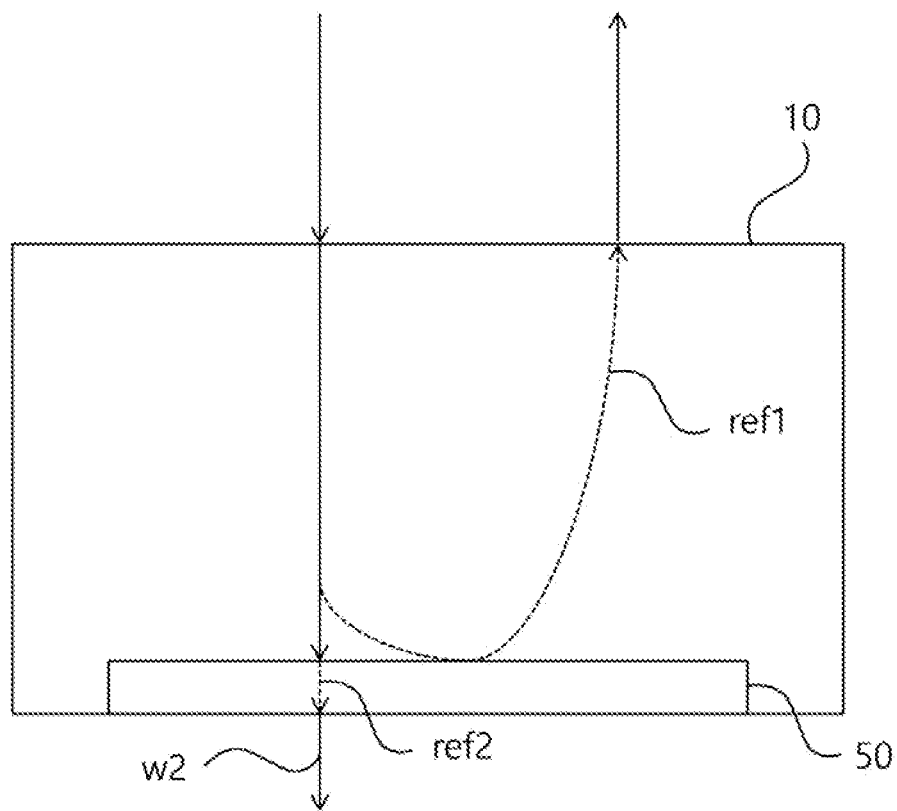
FIG. 14 is a view illustrating a chamber having a single layer and a supporter in the thickness measuring device according to one embodiment.

FIG. 14 is a view illustrating the chamber having a single layer and the supporter in the thickness measuring device according to one embodiment.

Referring to FIG. 14, at least a part of an electromagnetic wave emitted by the emission unit 200 passes through the chamber 10, is reflected by the supporter 50, and is output in the form of a first reference wave ref1. At least a part of the electromagnetic wave emitted by the emission unit 200 passes through the chamber 10 and the supporter 50 and is output in the form of a second reference wave ref2.

When the thickness measuring device 5 operates in the reflection mode, the first receiving unit 310 may receive the first reference wave ref1.

When the thickness measuring device 5 operates in the transmission mode, the first electromagnetic wave w1 may include the second reference wave ref2. The second receiving unit 320 may receive the first electromagnetic wave w1 including the second reference wave ref2.

Figure 15:
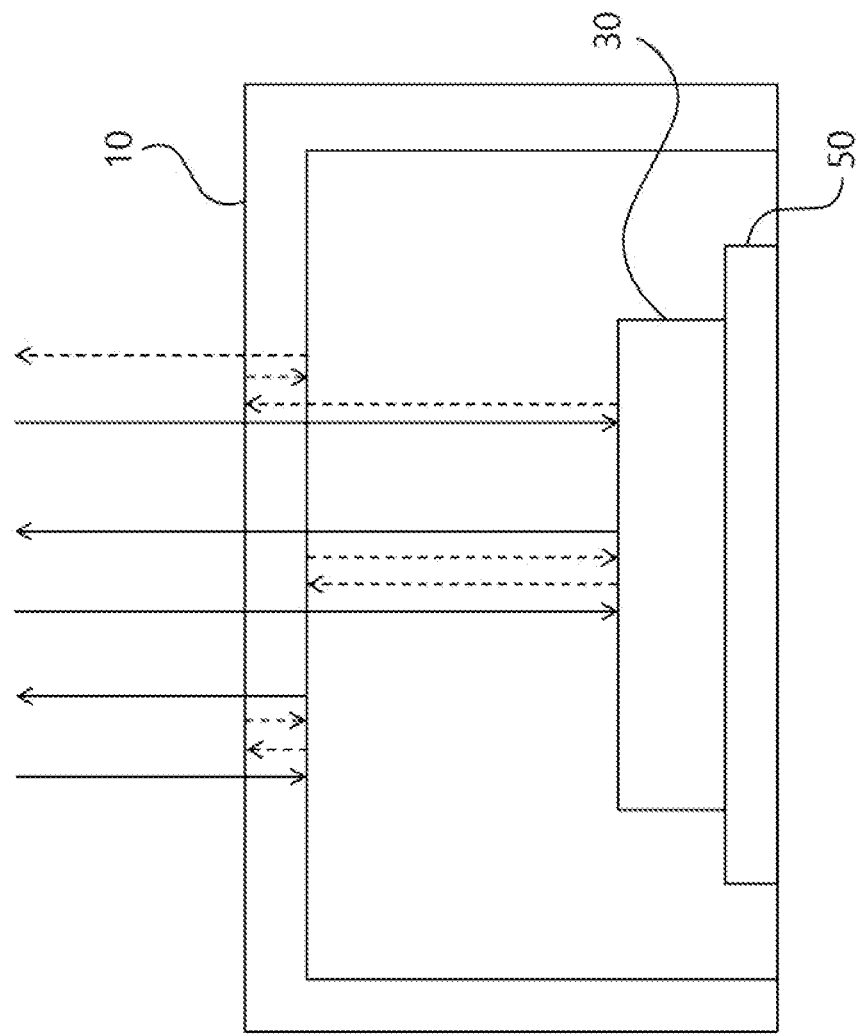
FIG. 15 is a view illustrating some causes of a superposition effect due to the chamber.

FIG. 15 is a view illustrating some causes of a superposition effect due to the chamber.

Referring to FIG. 15, the chamber 10 may have a predetermined thickness. According to control of the driving unit 110 of the control unit 100, multiple reflections of at least a part of an electromagnetic wave emitted by the emission unit 200 may occur in the chamber 10.

According to control of the driving unit 110 of the control unit 100, at least a part of the electromagnetic wave emitted by the emission unit 200 may pass through the chamber 10, and multiple reflections of the at least part of the electromagnetic wave may occur between the surface of the specimen 30 and the chamber 10.

According to control of the driving unit 110 of the control unit 100, at least a part of the electromagnetic wave emitted by the emission unit 200 may pass through the chamber 10 and be reflected by the surface of the specimen 30, and multiple reflections may occur in the chamber 10. Causes of a superposition effect due to the chamber 10 are not limited thereto.

Hereinafter, a method of measuring the thickness of the specimen 30 in the reflection mode of the thickness measuring device 5 will be described.

When the thickness measuring device 5 operates in the reflection mode, the driving unit 110 of the control unit 100 controls the emission unit 200 to emit an electromagnetic wave, and the control unit 100 may calculate the thickness of the specimen 30, wherein the first receiving unit 310 receives an electromagnetic wave which is the electromagnetic wave emitted by the emission unit 200 and reflected by and output from the specimen 30. The control unit 100 may measure the thickness of the specimen 30 on the basis of the first reflected wave r1 and the second reflected wave r2.

The control unit 100 may measure the thickness of the specimen 30 on the basis of a time point at which a peak of an electromagnetic wave emitted by the emission unit 200 occurs. The control unit 100 may measure the thickness of the specimen 30 on the basis of the first reflection time point rt1 at which a peak of the first reflected wave r1 occurs and the second reflection time point rt2 at which a peak of the second reflected wave r2 occurs.

At least a part of an electromagnetic wave emitted by the emission unit 200 may pass through the chamber 10 and may be reflected by the surface of the specimen 30 to form the first reflected wave r1. The first receiving unit 310 may receive the first reflected wave r1 reflected by the surface of the specimen 30.

At least a part of the electromagnetic wave emitted by the emission unit 200 may pass through the chamber 10 and the specimen 30 and may be reflected by the rear surface of the specimen 30 to form the second reflected wave r2. The first receiving unit 310 may receive the second reflected wave r2 reflected by the rear surface of the specimen 30.

The peak detecting unit 150 may detect a peak occurrence time point of an electromagnetic wave which is the electromagnetic wave emitted by the emission unit 200 and reflected by the specimen 30. The peak detecting unit 150 may detect the first reflection time point rt1 which is a time point at which the peak of the first reflected wave r1 reflected by and output from the surface of the specimen 30 occurs. The peak detecting unit 150 may detect the second reflection time point rt2 which is a time point at which the peak of the second reflected wave r2 reflected by and output from the rear surface of the specimen 30 occurs.

The first reflection time point rt1 and the second reflection time point rt2 may be determined by feature points. The feature points may be points at which an intensity of the first reflected wave r1 and an intensity of the second reflected wave r2 are sharply changed. The feature points may be points at which the intensity of the first reflected wave r1 and the intensity of the second reflected wave r2 are out of a predetermined critical range. The feature points may have maximum values or minimum values of the intensity of the first reflected wave r1 and the intensity of the second reflected wave r2. The feature points may have a peak value of the intensity of the first reflected wave r1 and a peak value of the intensity of the second reflected wave r2.

Hereinafter, a method of measuring the thickness of the specimen 30 in the transmission mode of the thickness measuring device 5 will be described.

In the control unit 100, the driving unit 110 controls the emission unit 200 to emit an electromagnetic wave, and the control unit 100 may calculate the thickness of the specimen 30, wherein the second receiving unit 320 receives an electromagnetic wave which is the electromagnetic wave emitted by the emission unit 200 and passing through and output from the specimen 30.

The control unit 100 may measure the thickness of the specimen 30 on the basis of the first transmitted wave k1. The control unit 100 may measure the thickness of the specimen 30 on the basis of a time point at which a peak of the electromagnetic wave emitted by the emission unit 200 occurs. The control unit 100 may measure the thickness of the specimen 30 on the basis of the first transmission time point kt1 at which a peak of the first transmitted wave k1 occurs.

At least a part of the electromagnetic wave emitted by the emission unit 200 may pass through the chamber 10 and the specimen 30 to form the first transmitted wave k1. The second receiving unit 320 may receive the first transmitted wave k1 passing through and output from the specimen 30.

The peak detecting unit 150 may detect a time point at which a peak of the electromagnetic wave emitted by the emission unit 200 and passing through the specimen 30 occurs. The peak detecting unit 150 may detect a first transmission time point kt1 which is a time point at which the peak of the first transmitted wave k1 passing through and output from the specimen 30 occurs.

The first transmission time point kt1 may be determined by feature points of the first transmitted wave k1. The feature point may be a point at which an intensity of the first transmitted wave k1 is changed sharply. The feature point may be a point at which an intensity of the first transmitted wave k1 is out of a predetermined critical range. The feature point may be a maximum value or minimum value of the intensity of the first transmitted wave k1. The feature point may be a peak value of the intensity of the first transmitted wave k1.

Hereinafter, equations for measuring the thickness of the specimen 30 of the thickness measuring device 5 will be described.

Figure 16:
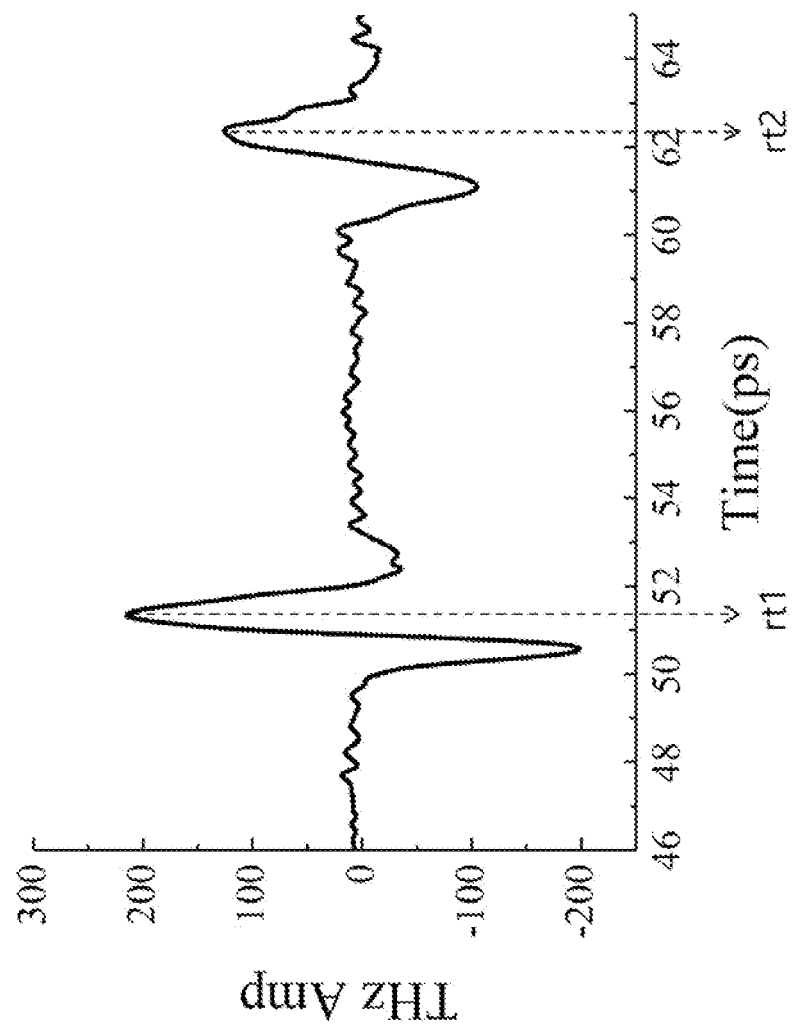
FIG. 16 is a graph showing an electromagnetic wave received by a first receiving unit of the thickness measuring device according to one embodiment.

FIG. 16 is a graph showing an electromagnetic wave received by the first receiving unit of the thickness measuring device according to one embodiment.

The thickness of the specimen 30 may be calculated by the thickness calculating unit 170 using Equation 1 on the basis of at least any one of an electromagnetic wave emitted by the emission unit 200, the first reflected wave r1, and the second reflected wave r2, and a reflection time.

$$d_{si} = \frac{C \cdot (t_{R2} - t_{R1})}{2 \cdot n} \quad \text{[Equation 1]}$$

(C: light speed, $d_{si}$: thickness of specimen, n: group refractive index of specimen, $t_{R2}$: second reflection time point rt2, $t_{R1}$: first reflection time point rt1)

FIG. 17 is a graph showing an electromagnetic wave received by the second receiving unit of the thickness measuring device according to one embodiment.

The thickness of the specimen 30 may be calculated by the thickness calculating unit 170 using Equation 2 on the basis of at least any one of an electromagnetic wave emitted by the emission unit 200, the first transmitted wave k1, the second reference wave ref2, and a transmission time.

$$d_{si} = \frac{C(t_\tau - t_{t,ref})}{n - 1} \quad \text{[Equation 2]}$$

(C: light speed, $d_{si}$: thickness of specimen, n: group refractive index of specimen, $t_\tau$: second reference time point ret2, $t_{t,ref}$: first transmission time point kt1)

The thickness calculating unit 170 of the thickness measuring device 5 may calculate a group refractive index of the specimen 30 on the basis of any one of the first reflection time point rt1, the second reflection time point rt2, the first transmission time point kt1, and the second reference time point ret2. The thickness calculating unit 170 may calculate the group refractive index of the specimen 30 on the basis of Equation 3.

$$n = \frac{1}{1 - 2 \cdot \frac{t_\tau - t_{t,ref}}{t_{R2} - t_{R1}}} \quad \text{[Equation 3]}$$

(n: group refractive index of specimen, $t_\tau$: first transmission time point, $t_{t,ref}$: second reference time point, $t_{R1}$: first reflection time point, $t_{R2}$: second reflection time point)

The thickness calculating unit 170 of the thickness measuring device 5 may calculate the thickness of the specimen 30 on the basis of any one of the first reflection time point rt1 and the first reference time point ret1. The control unit 100 may calculate the thickness of the specimen 30 on the basis of Equation 4.

$$d_{si} C \times (t_{n,ref} - t_{R1})$$ [Equation 4]

($d_{si}$: thickness of specimen, $t_{n,ref}$: first reference time point, $t_{R1}$: first reflection time point, C: light speed)

Using Equations 1 to 4, even when the group refractive index of the specimen is not known, the thickness of the specimen may be measured using the thickness measuring device according to the embodiment. The thickness measuring device according to the embodiment may measure the refractive index and the thickness of the specimen at the same time. In addition, the thickness measuring device may perform non-destructive inspection using a terahertz wave having high transmittance.

In addition, pieces of information substituted for Equations 1 to 4 in order to calculate the thickness and the refractive index may be obtained repeatedly. When the pieces of information substituted for the Equations 1 to 4 in order to calculate the thickness are obtained repeatedly, since average values of the repeatedly obtained pieces of information may be substituted for Equations 1 to 4, the thickness of the specimen may be more accurately measured.

Referring to FIG. 4, the first period may be determined as a predetermined numerical value. The first period may be a time duration of one electromagnetic wave. The first period may be a pulse time duration of one terahertz wave. The first period may be 3 ps.

When the first period is 3 ps, the thickness measuring device 5 may satisfy Expressions 1 to 3 below.

$$|d_q n_q (n-1) - d_{air}| \geq 0.45 \text{ mm}$$ [Expression 1]

($d_q$: thickness of chamber, $n_q$: refractive index of chamber, $d_{air}$: distance between chamber and specimen, n: number of multiple reflections in chamber)

$$|d_q n_q \times (n-1) + d_{air} \times (m-1) - d_{si} n_{si}| \geq 0.45 \text{ mm}$$ [Expression 2]

($d_q$: thickness of chamber, $n_q$: refractive index of chamber, $d_{air}$: distance between chamber and specimen, n: number of multiple reflections in chamber, m: number of multiple reflections between chamber and specimen, thickness of specimen, group refractive index of specimen)

$$|d_q n_q \times n - d_{si} n_{si}| \geq 0.45 \text{ mm}$$ [Expression 3]

($d_q$: thickness of chamber, $n_q$: refractive index of chamber, n: number of multiple reflections in chamber, $d_{si}$: thickness of specimen, $n_{si}$: group refractive index of specimen)

The invention claimed is:

1. A thickness measuring device for measuring a thickness of a specimen positioned in a chamber, the device comprising:
   a light which emits an electromagnetic wave in a direction toward the specimen;
   a detector which receives an electromagnetic wave output in a direction in which the chamber is positioned; and
   a controller which receives a signal from the detector and calculates the thickness of the specimen, wherein the detector receives a first electromagnetic wave having a first peak and a second electromagnetic wave having a second peak, wherein the first peak occurs at a first time point, and the second peak occurs at a second time point, wherein the first time point and the second time point have a difference at least a first time period, wherein at least a part of the chamber transmits a part of the electromagnetic wave and reflects the remaining part of the electromagnetic wave,
   wherein the first period is a period corresponding to a time duration of the first electromagnetic wave, wherein the time duration of the first electromagnetic wave is a period corresponding to a difference between a first periodic point and a second periodic point, wherein the first periodic point is a value which is earlier than the first time point, and a time point which is closest to the first time point among the time points which gradients are positive, and
   wherein the second periodic point is a value which is later than the first time point, and a time point which is closest to the first time point among the time point which gradients are negative.

2. The thickness measuring device of claim 1, wherein the first period is a period which satisfies that values at all time points in a range of the first time point to the second time point are smaller than a value of at least any one of the first peak and the second peak.

3. The thickness measuring device of claim 1, wherein the time duration of the first electromagnetic wave is a period between two time points which are closest to the first time point among time points at which the first electromagnetic wave has a value of zero.

4. The thickness measuring device of claim 1, wherein a value at the first periodic point and a value at the second periodic point are zero.

5. A thickness measuring device for measuring a thickness of a specimen positioned in a chamber the device comprising:
   a light which emits an electromagnetic wave in a direction toward the specimen;
   a detector which receives an electromagnetic wave output in a direction in which the chamber is positioned; and
   a controller which receives a signal from the detector and calculates the thickness of the specimen, wherein the detector receives a first electromagnetic wave having a first peak and a second electromagnetic wave having a second peak, wherein the first peak occurs at a first time point, and the second peak occurs at a second time point, wherein the first time point and the second time point have a difference at least a first time period, wherein at least a part of the chamber transmits a part of the electromagnetic wave and reflects the remaining part of the electromagnetic wave,
   wherein the first period is a period corresponding to a time duration of the first electromagnetic wave,
   wherein the time duration of the first electromagnetic wave is a period corresponding to a difference between a first periodic point and a second periodic point,
   wherein the first periodic point is a value which is earlier than the first time point, and a time point which is closest to the first time point among the time points which second differential values thereof are zero, and
   wherein the second periodic point is a value which is later than the first time point, and a time point which is closest to the first time point among the time points which second differential values thereof are zero.

6. A thickness measuring device for measuring a thickness of a specimen positioned in a chamber, the device comprising:
   a light which emits an electromagnetic wave in a direction toward the specimen;

a detector which receives an electromagnetic wave output in a direction in which the chamber is positioned; and a controller which receives a signal from the detector and calculates the thickness of the specimen, wherein the detector receives a first electromagnetic wave having a first peak and a second electromagnetic wave having a second peak, wherein the first peak occurs at a first time point, and the second peak occurs at a second time point, wherein the first time point and the second time point have a difference at least a first time period, wherein at least a part of the chamber transmits a part of the electromagnetic wave and reflects the remaining part of the electromagnetic wave, wherein the first period is a period corresponding to a time duration of the first electromagnetic wave, wherein the time duration of the first electromagnetic wave is a period corresponding to a difference between a first periodic point and a second periodic point, wherein the first periodic point is earlier than the first time point, and the second periodic point is later than the first time point, wherein the first periodic point is a time point which is closest to the first time point among time points at which a positive second differential value of the first electromagnetic wave is changed to a negative second differential value thereof, and wherein the second periodic point is a time point which is closest to the first time point among time points at which a negative second differential value of the first electromagnetic wave is changed to a positive second differential value thereof.

7. The thickness measuring device of claim 1, wherein the first electromagnetic wave has a first median, which is a half value of the first peak, at a third time point and a fourth time point, wherein the fourth time point is later than the first time point and the third time point, and wherein the first period is a period corresponding to a time difference between the third time point and the fourth time point.

8. The thickness measuring device of claim 1, wherein the first electromagnetic wave has a first median, which is a half value of the first peak, at a third time point and a fourth time point, wherein the second electromagnetic wave has a second median, which is a half value of the second peak, at a fifth time point and a sixth time point, wherein the fourth time point is a time point later than the third time point, and the sixth time point is a time point later than the fifth time point, and wherein the first period is a period which satisfies that the fifth time point is later than the fourth time point.

9. The thickness measuring device of claim 1, wherein the first electromagnetic wave has a first median, which is a half value of the first peak, at a third time point and a fourth time point, wherein the second electromagnetic wave has a second median, which is a half value of the second peak, at a fifth time point and a sixth time point, wherein a gradient at the third time point and a gradient at the fifth time point have positive values, and a gradient at the fourth time point and a gradient at the sixth time point have negative values, and wherein the first period is a period which satisfies that the fifth time point is later than the fourth time point.

10. The thickness measuring device of claim 1, wherein the controller controls the light to emit the electromagnetic wave in the direction toward the specimen, and the controller receives a signal from the detector and calculates a refractive index of the specimen and the thickness of the specimen to determine a result value, and the controller stores the result value.

11. The thickness measuring device of claim 1, wherein the first electromagnetic wave includes a wave reflected by and output from the chamber, wherein the second electromagnetic wave includes a first reflected wave reflected by a surface of the specimen, a second reflected wave reflected by a rear surface of the specimen, and a first transmitted wave passing through and output from the specimen, wherein a peak of the first reflected wave occurs at a first reflection time point, wherein a peak of the second reflected wave occurs at a second reflection time point, and wherein a peak of the first transmitted wave occurs at a first transmission time point.

12. The thickness measuring device of claim 11, wherein the controller prestores a first reference time point and a second reference time point, wherein the first reference time point is a time point at which a peak of a wave passing through the chamber, reflected by a supporter, and output through the chamber occurs, and the second reference time point is a time point at which a peak of a wave output by passing through one side and the other side of the chamber occurs.

13. The thickness measuring device of claim 12, wherein the controller calculates a group refractive index of the specimen on the basis of the first reflection time point, the second reflection time point, the first transmission time point, and the second reference time point using an equation of $$n = \frac{1}{1 - 2 \cdot \frac{t_T - t_{t,ref}}{t_{R2} - t_{R1}}}$$

(n: group refractive index of specimen, t: first transmission time point, $t_{t,ref}$: second reference time point, $t_{R1}$: first reflection time point, $t_{R2}$: second reflection time point).

14. The thickness measuring device of claim 13, wherein the controller calculates the thickness of the specimen on the basis of the first reflection time point, the second reflection time point, and the group refractive index of the refractive index of specimen using an equation of $$d_{si} = C \cdot \frac{t_{R2} - t_{R1}}{2 \cdot n}$$

($d_{si}$: thickness of specimen, n: group reflective index of specimen, $t_{R1}$: first reflection time point, $t_{R2}$: second reflection time point, C: light speed).

15. The thickness measuring device of claim 13, wherein the controller calculates the thickness of the specimen on the basis of the first transmission time point, the group refractive index of specimen, and the second reference time point using an equation of $$d_{si} = \frac{C(t_T - t_{t,ref})}{n - 1}$$

($d_{si}$: thickness of specimen, n: group refractive index of specimen, $t_\tau$: first transmittance time point, $t_{t,ref}$: second reference time point, C: light speed).

16. The thickness measuring device of claim 12, wherein the controller calculates the thickness of the specimen on the basis of the first reflection time point and the first reference time point using an equation of $d_{si}=C\times(t_{n,ref}-t_{R1})$ ($d_{si}$: thickness of specimen, $t_{n,ref}$: first reference time point, $t_{R1}$: first reflection time point, C: light speed).

17. The thickness measuring device of claim 1,
wherein the first period is 3 ps, and
wherein an expression of $|d_q n_q(n-1)-d_{air}|\geq 0.45$ mm ($d_q$: thickness of chamber, $n_q$: refractive index of chamber, $d_{air}$: distance between chamber and specimen, n: number of multiple reflections in chamber) is satisfied on the basis of a thickness of the chamber, a refractive index of the chamber, a distance between the chamber and the specimen, and the number of multiple reflections in the chamber which are prestored in the controller.

18. The thickness measuring device of claim 1,
wherein the first period is 3 ps, and
wherein an expression of $|d_q n_q\times(n-1)+d_{air}\times(m-1)-d_{si}n_{si}|\geq 0.45$ mm ($d_q$: thickness of chamber, $n_q$: refractive index of chamber, $d_{air}$: distance between chamber and specimen, n: number of multiple reflections in chamber, m: number of multiple reflections between chamber and specimen, $d_{si}$: thickness of specimen, $n_{si}$: group refractive index of specimen) is satisfied on the basis of a thickness of the chamber, a refractive index of the chamber, a distance between the chamber and the specimen, the number of multiple reflections in the chamber, and the number of multiple reflections between the chamber and the specimen which are prestored in the controller.

19. The thickness measuring device of claim 1,
wherein the first period is 3 ps, and
wherein an expression of $|d_q n_q\times n-d_{si}n_{si}|\geq 0.45$ mm ($d_q$: thickness of chamber, $n_q$: refractive index of chamber, n: number of multiple reflections in chamber, $d_{si}$: thickness of specimen, $n_{si}$: group refractive index of specimen) is satisfied on the basis of a thickness of the chamber, a refractive index of the chamber, and the number of multiple reflections in the chamber which are stored in the controller and the thickness of the specimen and a group refractive index of the specimen deduced by the controller.

* * * * *